United States Patent
Lee et al.

(10) Patent No.: US 12,045,422 B2
(45) Date of Patent: Jul. 23, 2024

(54) ELECTRONIC DEVICE

(71) Applicant: SAMSUNG DISPLAY CO., LTD., Yongin-si (KR)

(72) Inventors: Soongyu Lee, Seoul (KR); Jinwoo Kim, Hwaseong-si (KR); Jeongheon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/581,377

(22) Filed: Jan. 21, 2022

(65) Prior Publication Data

US 2022/0308696 A1    Sep. 29, 2022

(30) Foreign Application Priority Data

Mar. 23, 2021 (KR) ........................ 10-2021-0037478

(51) Int. Cl.
 *G06F 3/044* (2006.01)
 *G06F 3/041* (2006.01)

(52) U.S. Cl.
 CPC ........ *G06F 3/0442* (2019.05); *G06F 3/04166* (2019.05); *G06F 3/0441* (2019.05)

(58) Field of Classification Search
 CPC .......... G06F 3/041; G06F 3/03; G06F 3/0442; G06F 3/0441; G06F 3/044; G09G 3/20
 See application file for complete search history.

(56) References Cited

U.S. PATENT DOCUMENTS

| | | | |
|---|---|---|---|
| 9,495,024 B2* | 11/2016 | Watanabe | G06F 3/044 |
| 10,809,817 B2 | 10/2020 | Katsurahira et al. | |
| 10,877,578 B2* | 12/2020 | Hisano | G06F 3/03546 |
| 10,942,598 B2* | 3/2021 | Koike | G06F 3/0383 |
| 11,036,331 B2 | 6/2021 | Kim et al. | |
| 11,150,761 B2* | 10/2021 | Hara | G06F 3/046 |
| 11,385,729 B2* | 7/2022 | Yamamoto | G06F 3/038 |
| 11,397,482 B2* | 7/2022 | Miyamoto | G06F 3/03545 |
| 11,429,206 B2* | 8/2022 | Hisano | G06F 3/0446 |
| 11,768,558 B2* | 9/2023 | Lee | G06F 3/0441 345/174 |

(Continued)

FOREIGN PATENT DOCUMENTS

| | | |
|---|---|---|
| JP | 2020-038732 A | 3/2020 |
| KR | 10-2020-0025174 A | 3/2020 |
| KR | 10-2020-0082506 A | 7/2020 |

*Primary Examiner* — Olga V Merkoulova
(74) *Attorney, Agent, or Firm* — Lewis Roca Rothgerber Christie LLP

(57) ABSTRACT

Provided is an electronic device including a display panel configured to display an image, an input sensing layer on the display panel, and configured to operate in a first sensing mode in which a first input is sensed, or a second sensing mode in which a second input provided by an input device is sensed, and a sensing controller configured to control an operation of the input sensing layer, wherein, in the first sensing mode, the sensing controller operates in a first mode in which an uplink signal for searching the input device is transmitted at a first frequency to the input sensing layer, or a second mode in which the uplink signal is transmitted at a second frequency, which is less than the first frequency, to the input sensing layer, and wherein, in the second sensing mode, the sensing controller transmits the uplink signal at the first frequency to the input sensing layer.

20 Claims, 17 Drawing Sheets

(56) References Cited

U.S. PATENT DOCUMENTS

| | | | |
|---|---|---|---|
| 2015/0242043 A1* | 8/2015 | Oda | G06F 3/0446 |
| | | | 345/174 |
| 2016/0252981 A1* | 9/2016 | Chang | G06F 3/0446 |
| | | | 345/179 |
| 2016/0299583 A1* | 10/2016 | Watanabe | G06F 3/03545 |
| 2018/0150178 A1* | 5/2018 | Kim | G06F 3/04166 |
| 2018/0329524 A1* | 11/2018 | Yamamoto | G06F 3/038 |
| 2018/0356908 A1* | 12/2018 | Koike | G06F 3/0442 |
| 2020/0026369 A1* | 1/2020 | Hisano | G06F 3/0446 |
| 2020/0210021 A1 | 7/2020 | Ju et al. | |
| 2021/0232239 A1* | 7/2021 | Hara | G06F 3/03545 |
| 2021/0345361 A1* | 11/2021 | Hisano | H04L 5/0053 |
| 2022/0197468 A1* | 6/2022 | Lee | G06F 3/0442 |

* cited by examiner

ELECTRONIC DEVICE

CROSS-REFERENCE TO RELATED APPLICATION

This application claims priority to, and the benefit of, Korean Patent Application No. 10-2021-0037478, filed on Mar. 23, 2021, the entire contents of which are hereby incorporated by reference.

BACKGROUND

1. Field

The present disclosure herein relates to an electronic device having improved input sensing performance.

2. Description of the Related Art

Multimedia electronic devices, such as televisions, mobile phones, tablet computers, navigators, game consoles, and the like includes a display device for displaying an image. Such an electronic device may include an input sensing layer, which is capable of sensing a touch-based input manner that allows a user to easily input information or commands intuitively and conveniently, in addition to a usual input manners, such as a button, a keyboard, a mouse, and the like.

The input sensing layer may sense a touch or pressure using a user's body. In addition, the input sensing layer may sense a touch or pressure using a pen capable of detailed touch input for a user who is familiar with an information input using a writing instrument or for a specific application (for example, application program for sketching or drawing).

SUMMARY

The present disclosure provides an electronic device for improving sensing sensitivity of an input sensing layer.

Some embodiments of the present disclosure provide an electronic device including a display panel configured to display an image, an input sensing layer on the display panel, and configured to operate in a first sensing mode in which a first input is sensed, or a second sensing mode in which a second input provided by an input device is sensed, and a sensing controller configured to control an operation of the input sensing layer, wherein, in the first sensing mode, the sensing controller operates in a first mode in which an uplink signal for searching the input device is transmitted at a first frequency to the input sensing layer, or a second mode in which the uplink signal is transmitted at a second frequency, which is less than the first frequency, to the input sensing layer, and wherein, in the second sensing mode, the sensing controller transmits the uplink signal at the first frequency to the input sensing layer.

The electronic device may further include a main controller configured to control an operation of the electronic device, and configured to transmit, to the sensing controller, a sensing control signal that controls an operation of the sensing controller.

The sensing control signal may include a first sensing control signal and a second sensing control signal, wherein the sensing controller operates in the first mode when the first sensing control signal is received, and operates in the second mode when the second sensing control signal is received.

The main controller may be configured to transmit the first sensing control signal to the sensing controller when a first application is executed in the electronic device, and the second sensing control signal to the sensing controller when a second application is executed in the electronic device.

The first application may include an application that receives the second input to operate, wherein the second application includes an application that receives the first input to operate.

A device sensing period in which the input sensing layer operates in the second sensing mode may include a synchronization period and an operation period, wherein the sensing controller is configured to transmit the uplink signal at the first frequency to the input sensing layer during the synchronization period for recognizing the input device, and the uplink signal at a frequency that is less than the first frequency to the input sensing layer during the operation period in which the second input is received.

The operation period may include a first operation period, and a second operation period, and wherein the sensing controller is configured to transmit the uplink signal at a third frequency that is less than the first frequency to the input sensing layer during the first operation period, and the uplink signal at a fourth frequency that is less than the third frequency to the input sensing layer during the second operation period.

The device sensing period may further include a transition period for converting the frequency of the uplink signal, which is transmitted from the sensing controller to the input sensing layer, from the first frequency to a third frequency that is less than the first frequency.

The transition period may include a first sub transition period and a second sub transition period, wherein the sensing controller is configured to transmit the uplink signal at the first frequency to the input sensing layer during the first sub transition period, and the uplink signal at the third frequency to the input sensing layer during the second sub transition period, and wherein the first and second sub transition periods are alternately repeated within the transition period.

The input sensing layer may be configured to sense the first input in the second sensing mode.

Some embodiments of the present disclosure provide an electronic device including a display panel configured to display an image, an input sensing layer on the display panel, and configured to operate in a first sensing mode in which a first input is sensed, or in a second sensing mode in which a second input provided by an input device is sensed, and a sensing controller configured to control an operation of the input sensing layer, wherein a device sensing period in which the input sensing layer operates in the second sensing mode includes a first synchronization period and a first operation period, and wherein the sensing controller is configured to transmit a first uplink signal for searching a first input device at a first frequency to the input sensing layer during the first synchronization period for recognizing the first input device, and to transmit the first uplink signal at a frequency that is less than the first frequency to the input sensing layer during the first operation period in which the second input is recessed.

The device sensing period may further include a second operation period, wherein the sensing controller is configured to transmit the first uplink signal at a second frequency that is less than the first frequency to the input sensing layer during the first operation period, and the first uplink signal at a third frequency that is less than the second frequency to the input sensing layer during the second operation period.

The device sensing period may further include a transition period for converting the frequency of the first uplink signal, which is transmitted from the sensing controller to the input sensing layer, from the first frequency to a second frequency that is less than the first frequency.

The transition period may include a first sub transition period and a second sub transition period, wherein the sensing controller is configured to transmit the first uplink signal at the first frequency to the input sensing layer during the first sub transition period, and the first uplink signal at the second frequency to the input sensing layer during the second sub transition period, and wherein the first and second sub transition periods are alternately repeated within the transition period.

The input sensing layer may be configured to sense a third input provided by a second input device in the second sensing mode, wherein the sensing controller is configured to transmit, to the input sensing layer, a second uplink signal at the first frequency for searching the first and second input devices during the first synchronization period to recognize the first and second input devices, receive the second and third inputs, and transmit the second uplink signal at a frequency that is less than the first frequency to the input sensing layer during the first operation period.

The input sensing layer may be configured to sense a third input provided by a second input device after the first synchronization period, wherein the device sensing period further includes a second synchronization period and a second operation period, and wherein the sensing controller is configured to transmit a second uplink signal to the input sensing layer at the first frequency for searching the first and second input devices during the second synchronization period for recognizing the first and second input devices, and the second uplink signal to the input sensing layer at a second frequency that is less than the first frequency during the second operation period in which the first and second inputs are received.

The sensing controller may be configured to sense the first input through the input sensing layer during a first input sensing frame in the first sensing mode, and to sense the second input through the input sensing layer during a second input sensing frame in the second sensing mode, wherein the second input sensing frame includes a first period in which the sensing controller transmits the first uplink signal to the input sensing layer, a second period in which the sensing controller receives a downlink signal from the first input device through the input sensing layer, and a third period in which the sensing controller does not sense the second input through the input sensing layer.

In the first synchronization period, the second period may include a data period in which a data signal including information on the first input device is received, and a first position period in which a position signal including information on the second input is received, wherein, in the first operation period, the second period includes a second position period in which the position signal including the information on the second input is received, and wherein the second period does not include a period in which the data signal including the information on the first input device is received.

The third period in the first operation period may have a width that is greater than that of the third period in the first synchronization period.

The sensing controller may be configured to sense the first input through the input sensing layer in the third period.

BRIEF DESCRIPTION OF THE DRAWINGS

The accompanying drawings are included to provide a further understanding of the present disclosure, and are incorporated in, and constitute a part of, this specification. The drawings illustrate embodiments of the present disclosure and, together with the description, serve to explain aspects of the present disclosure. In the drawings.

DETAILED DESCRIPTION

Figure 1:
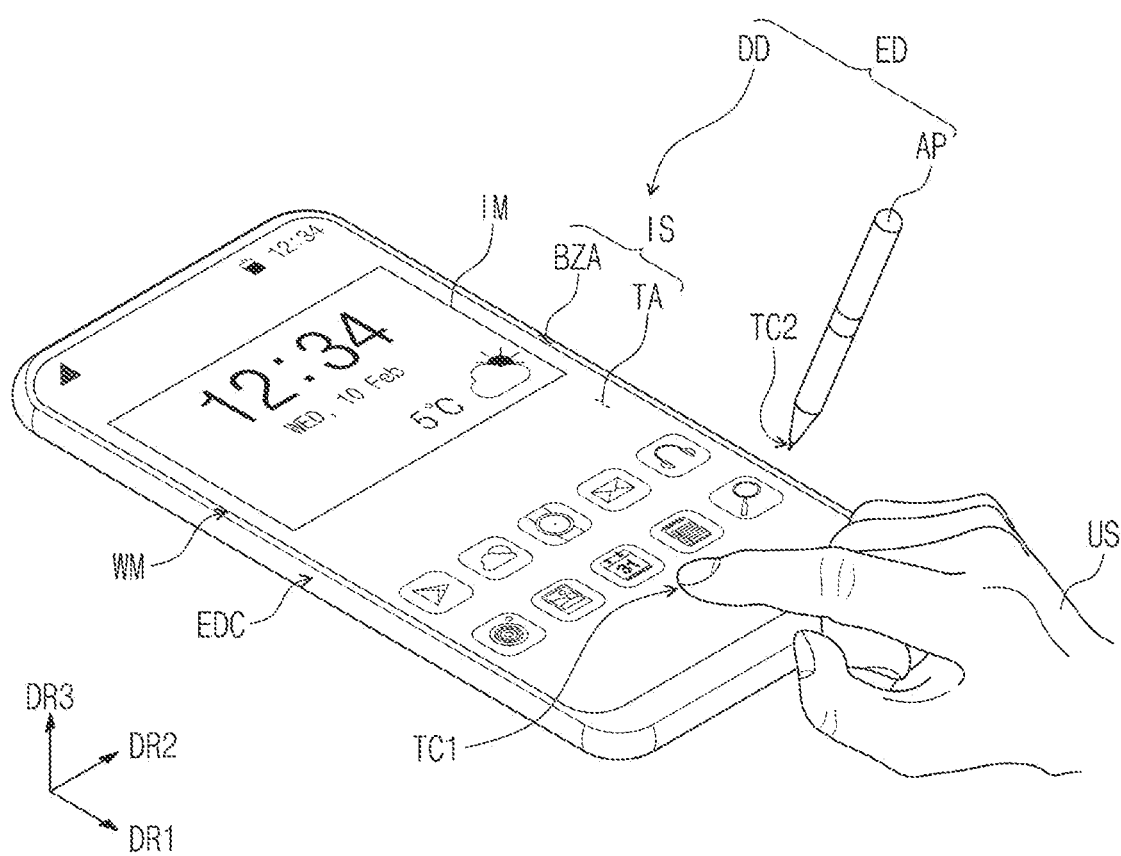
FIG. 1 is a perspective view of an electronic device according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
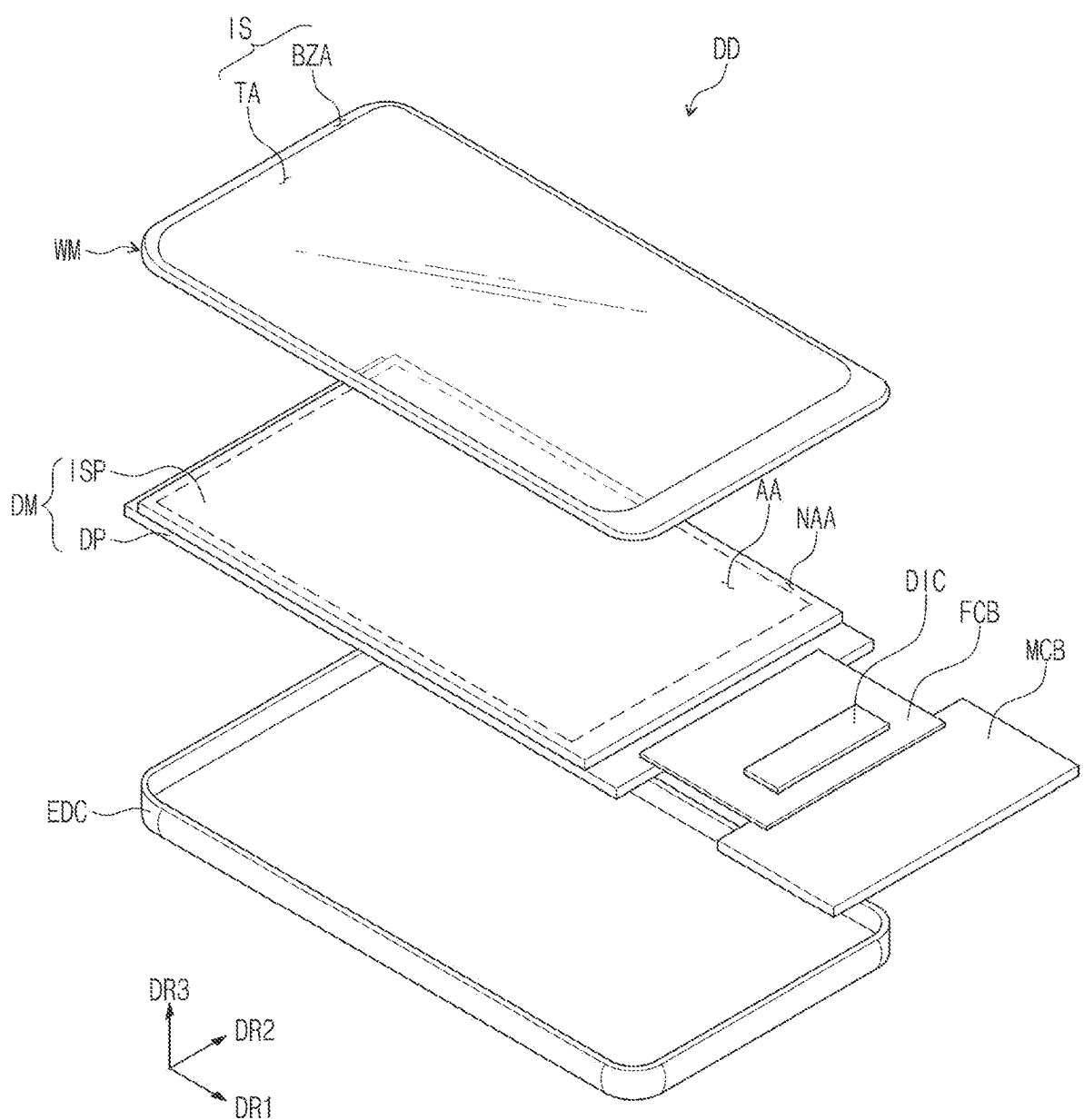
FIG. 2 is an exploded perspective view of the display device of FIG. 1.

FIG. 1 is a perspective view of an electronic device according to some embodiments of the present disclosure, and FIG. 2 is an exploded perspective view of the display device of FIG. 1.

Referring to FIGS. 1 and 2, an electronic device ED includes a display device DD and a first input device AP.

A display device DD may be a device that is activated according to an electrical signal. The display device DD according to the present disclosure may be used for large-sized display devices such as televisions, monitors, and the like and small and middle-sized display devices such as mobile phones, tablet PC, navigation units for vehicles, game consoles, and the like. The above-described devices are proposed as merely some embodiments, and thus, the electronic device ED may be adopted for other electronic devices unless departing from the spirit and scope of the invention.

The display device DD according to some embodiments of the present disclosure has a rectangular shape having long sides in the first direction DR1, and short sides in the second direction DR2 crossing the first direction DR1. However, the display device DD is not limited in shape. For example, the display device DD may have various shapes. The display device DD may display an image IM in the third direction DR3 on a display surface IS that is parallel to each of the first and second directions DR1 and DR2. The display surface IS on which the image IM is displayed may correspond to a front surface of the display device DD.

In some embodiments, a front surface (or a top surface) or a rear surface (or a bottom surface) of each of members may be defined based on a direction in which the image IM is displayed. The front and rear surfaces may be opposite to each other in the third direction DR3. A normal direction of each of the front and rear surfaces may be substantially parallel to the third direction DR3.

A spaced distance between the front and rear surfaces in the third direction DR3 may correspond to a thickness of the display device DD in the third direction DR3. The directions indicated as the first to third directions DR1, DR2, and DR3 may be a relative concept, and thus may be changed into different directions.

The display device DD may sense an external input applied from the outside. The external input may include various types of inputs provided from the outside of the display device DD. The display device DD according to some embodiments of the present disclosure may sense a first input TC1 of a user US, which is applied from the outside. The first input TC1 of the user US may be one or a combination of various types of external inputs, such as a portion of the user's body, light, heat, or a pressure. In some embodiments, it may be assumed that the first input TC1 of the user US is a touch input by a user's hand applied to the front surface, but this is merely illustrative, and thus, as described above, the first input TC1 of the user US may be provided in various forms. Also, the display device DD may sense the first input TC1 of the user US, which is applied to a side or rear surface of the display device DD, according to a structure of the display device DD, but is not limited to a specific embodiment.

The display device DD according to some embodiments of the present disclosure may sense a second input TC2 applied from the outside. The second input TC2 includes inputs through a first input device AP (for example, a stylus pen, an active pen, a touch pen, an electronic pen, an e-pen, etc.) in addition to the user's hand. In the following description, a case in which the second input TC2 is an input through the active pen will be described as an example.

The display device DD and the first input device AP may bidirectionally communicate with each other. The display device DD may provide an uplink signal ULS (see FIG. 6) to the first input device AP. For example, the uplink signal ULS may include a synchronization signal or information of the display device DD, but is not particularly limited thereto. The first input device AP may provide a downlink signal DLS (see FIG. 6) to the display device DD. The downlink signal may include a synchronization signal or state information of the input device AP. For example, the downlink signal may include position information of the first input device AP, battery information of the first input device AP, inclination information of the first input device AP, and/or various information stored in the first input device, but is not particularly limited thereto. The uplink signal ULS and the downlink signal DLS will be described later with reference to description of FIG. 6.

The front surface of the display device DD may be divided into a transmission area TA and a bezel area BZA. The transmission area TA may be an area on which the image IM is displayed. A user may see the image IM through the transmission area TA. In some embodiments, each of vertexes of the transmission area TA may have a rounded rectangular shape. However, this is merely an example. For example, the display device DD may have various shapes and is not limited to any particular embodiment.

The bezel area BZA is adjacent to the transmission area TA. The bezel area BZA may have a color (e.g., a predetermined color). The bezel area BZA may surround the transmission area TA. Thus, the shape of the transmission area TA may be substantially defined by the bezel area BZA. However, this is merely an example. For example, the bezel area BZA may be located adjacent to only one side of the transmission area TA or be omitted. The display device DD according to some embodiments of the present disclosure may be implemented according to various embodiments, but is not limited to any specific embodiment.

As illustrated in FIG. 2, the display device DD may include a display module DM, and a window WM located on the display module DM. The display module DM may include a display panel DP and an input sensing layer ISP.

According to some embodiments of the present disclosure, the display panel DP may be an emission-type display panel. For example, the display panel DP may be an organic light emitting display panel or a quantum dot light emitting display panel. The organic light emitting display panel may include an organic light emitting material. An emission layer of the quantum dot light emitting display panel may include a quantum dot, a quantum rod, and the like. The display panel DP may output an image IM, and the output image may be displayed through the display surface IS.

The input sensing layer ISP may be located on the display panel DP to sense the first input TC1 and the second input TC2. The configuration and operation of the input sensing layer ISP will be described later with reference to FIGS. 4 and 5.

The window WM may be made of a transparent material that is capable of emitting the image IM. For example, the window layer WM may be made of glass, sapphire, plastic, and the like. Although the window WM is provided as a single layer, the embodiments of the present disclosure are not limited thereto. For example, the window WM may include a plurality of layers.

In some embodiments, the bezel area BZA of the above-described display device DD may be substantially provided as an area on which a material having a color (e.g., a predetermined color) is printed on one area of the window WM. In some embodiments of the present disclosure, the window WM may include a light blocking pattern for defining the bezel area BZA. The light blocking pattern may be formed using a colored organic film, for example, in a coating manner.

The window WM may be coupled to the display module DM through an adhesive film. As an example of some embodiments of the present disclosure, the adhesive film may include an optically clear adhesive film (OCA). However, the adhesive film is not limited thereto and may include a typical adhesive or pressure-sensitive adhesive. For example, the adhesive film may include an optically clear resin (OCR) or a pressure sensitive adhesive film (PSA).

An antireflection layer may be further located between the window WM and the display module DM. The antireflection layer reduces reflectance of external light incident from an upper side of the window WM. The antireflection unit according to some embodiments of the present disclosure may include a retarder and a polarizer. The retarder may be a film type or liquid crystal coating type retarder and may include a $\lambda/2$ retarder and/or a $\lambda/4$ retarder. The polarizer may also be provided in a film type or liquid crystal coating type polarizer. The film type may include an elongation-type synthetic resin, and the liquid crystal coating type may include liquid crystals that are arranged in an arrangement (e.g., a predetermined arrangement). The retarder and the polarizer may be implemented as one polarizing film.

The display module DM may display an image according to an electrical signal, and may transmit/receive information on an external input. The display module DM may be defined to be divided into an active area AA and an-active area NAA. The active area AA may be defined as an area that emits an image provided from the display module DM. In addition, the active area AA may be defined as an area on which the input sensing layer ISP senses the first input TC1 and the second input TC2, which are applied from the outside.

The non-active area NAA is adjacent to the active area AA. For example, the non-active area NAA may surround the active area AA. However, this is merely an example. For example, the non-active area NAA may have various shapes and is not limited to any specific embodiment. According to some embodiments, the active area AA of the display module DM may correspond to at least a portion of the transmission area TA.

The display module DM may further include a main circuit board MCB, a flexible circuit film FCB, and a driving chip DIC. The main circuit board MCB may be connected to the flexible circuit film FCB and electrically connected to the display panel DP. The flexible printed circuit film FCB is connected to the display panel DP to electrically connect the display panel DP to the main circuit board MCB.

The main circuit board MCB may include a plurality of driving elements. The plurality of driving elements may include a circuit part for driving the display panel DP. A driving chip DIC may be mounted on the flexible circuit film FCB. The flexible circuit film FCB according to some embodiments of the present disclosure is illustrated as one film, but is not limited thereto. For example, the flexible circuit film FCB may be provided in plurality, and may be connected to the display panel DP. A structure in which the driving chip DIC is mounted on the flexible circuit film FCB is illustrated in FIG. 2, but the embodiments of the present disclosure are not limited thereto. For example, the driving chip DIC may be directly mounted on the display panel DP. In this case, a portion of the display panel DP, on which the driving chip DIC is mounted, may be bent to be located on a rear surface of the display module DM.

The input sensing layer ISP may be electrically connected to the main circuit board MCB through the flexible circuit film FCB. However, the embodiments of the present disclosure are not limited thereto. That is, the display module DM may additionally include a flexible circuit film for electrically connecting the input sensing layer ISP to the main circuit board MCB.

The display device DD further includes an external case EDC that accommodates the display module DM. The external case EDC may be bonded to the window WM to define an outer appearance of the display device DD. The external case EDC absorbs an external impact, and reduces or prevents foreign substances/moisture permeating into the display module DM to protect the components accommodated in the external case EDC. As an example of some embodiments of the present disclosure, the external case EDC may be provided in a shape in which a plurality of accommodation members are bonded to each other.

The display device DD according to some embodiments includes an electronic module including various functional modules for driving the display module DM, a power supply module for supplying power required for the overall operation of the display device DD, and a bracket bonded to the display module DM and/or the external case EDC to divide an internal space of the display device DD.

Figure 3:
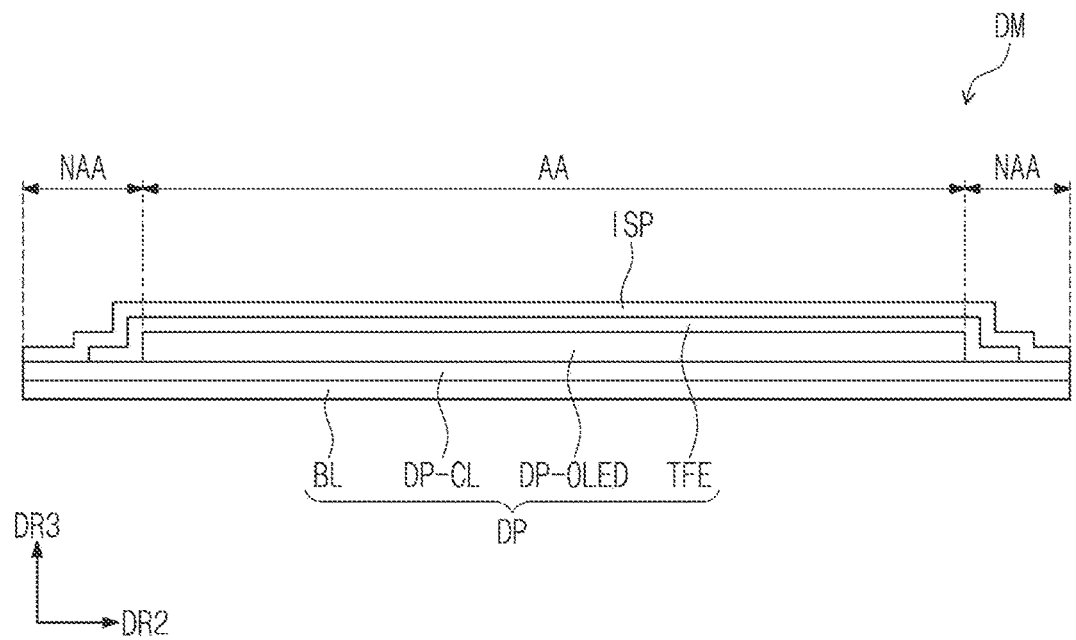
FIG. 3 is a cross-sectional view of a display module of FIG. 2.

FIG. 3 is a cross-sectional view of the display module of FIG. 2.

Referring to FIG. 3, the display module DM may include the display panel DP and the input sensing layer ISP. The display panel DP includes a base layer BL, a circuit element layer DP-CL located on the base layer BL, a display element layer DP-OLED, and an encapsulation layer TFE. In some embodiments, the display panel DP may further include functional layers, such as the anti-reflection layer, a reflective index adjustment layer, and the like.

The base layer BL may include at least one plastic film. The base layer BL may include a plastic substrate, a glass substrate, a metal substrate, and an organic/inorganic composite substrate. As an example of some embodiments of the present disclosure, the base layer BL may be a flexible substrate. The active area AA and the non-active area NAA described with reference to FIG. 2 may be equally defined on the base layer BL.

The circuit element layer DP-CL includes at least one intermediate insulation layer and a circuit element. The intermediate insulation layer includes at least one intermediate inorganic layer and at least one intermediate organic layer. The circuit element includes signal lines, a driving circuit of a pixel, and the like.

The display element layer DP-OLED may include a light emitting element. The light emitting element may include at least organic light emitting diodes. The display element layer DP-OLED may further include an organic layer such as a pixel defining layer.

The encapsulation layer TFE seals the display element layer DP-OLED. The encapsulation layer TFE includes at least one inorganic layer. The encapsulation layer TFE may further include at least one organic layer. The inorganic layer protects the display element layer DP-OLED against moisture/oxygen, and the organic layer protects the display element layer DP-OLED against foreign substances such as dust particles. The inorganic layer may include a silicon nitride layer, a silicon oxynitride layer, and a silicon oxide layer, a titanium oxide layer, or an aluminum oxide layer. The organic layer may include an acrylic-based organic layer, but the embodiments of the present disclosure are not limited thereto.

The input sensing layer ISP may be located on the display panel DP by a continuous process. Also, the input sensing layer ISP and the display panel DP may be bonded to each other through an adhesive film. The input sensing layer ISP may have a multilayered structure. The input sensing layer ISP may include an insulation layer having a single or multilayered structure. According to some embodiments of the present disclosure, when the input sensing layer ISP is directly located on the display panel DP by the continuous process, the input sensing layer ISP may be directly located on the encapsulation layer TFE, and the adhesive film may not be located between the input sensing layer ISP and the display panel DP. However, in other embodiments, the adhesive film may be located between the input sensing layer ISP and the display panel DP. In this case, the input sensing layer ISP might not be manufactured together with the display panel DP by the continuous process. Thus, after being manufactured through a process separate from the process of forming the display panel DP, the input sensing layer ISP may be fixed to a top surface of the display panel DP by the adhesive film.

Figure 4:
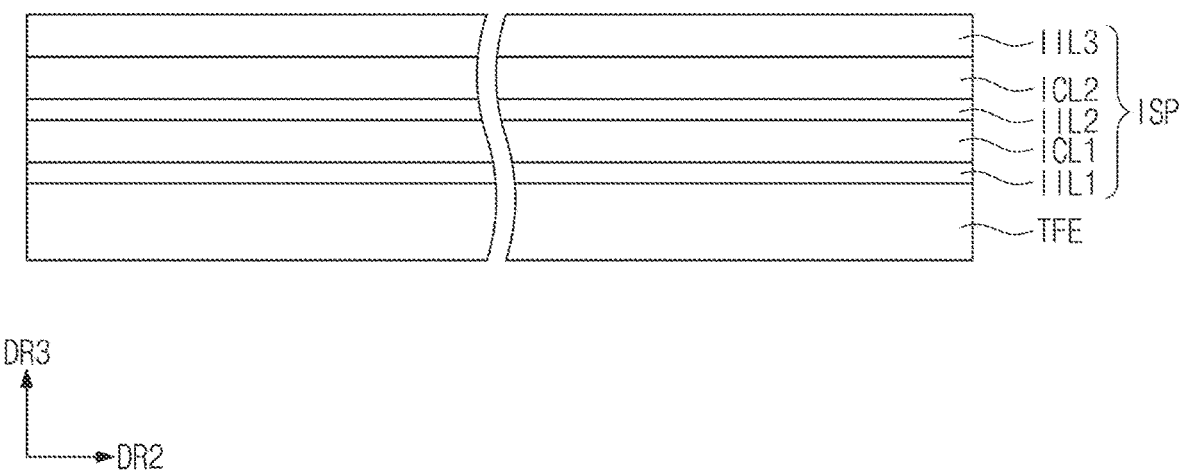
FIG. 4 is a cross-sectional view illustrating a configuration of an input sensing layer of FIG. 2.

FIG. 4 is a cross-sectional view illustrating a configuration of the input sensing layer of FIG. 2.

Referring to FIG. 4, the input sensing layer ISP may include a first sensing insulation layer IIL1, a first conductive layer ICL1, a second sensing insulation layer IIL2, a second conductive layer ICL2, and a third sensing insulation layer IIL3. The first sensing insulation layer IIL1 may be directly located on the encapsulation layer TFE. However, in some embodiments of the present disclosure, the first sensing insulation layer IIL1 may be omitted.

Each of the first and second conductive layers ICL1 and ICL2 may include a plurality of conductive patterns. The conductive patterns may include a plurality of sensing electrodes SE1_1 to SE1_5 and SE2_1 to SE2_4 (see FIG. 5) and a plurality of signal lines SL1_1 to SL1_5 and SL2_1 to SL2_4 (see FIG. 5) connected to the plurality of sensing electrodes SE1_1 to SE1_5 and SE2_1 to SE2_4.

Each of the first and second insulation layers IIL1 and IIL2 may include an inorganic or organic material. In some embodiments, each of the first insulation layer IIL1 and the second insulation layers IIL2 may be an inorganic layer. The inorganic layer may include at least one of oxide, titanium oxide, silicon oxide, silicon oxide nitride, zirconium oxide, or hafnium oxide. The inorganic layer may have a thickness of about 1,000 angstroms to about 4,000 angstroms.

The third sensing insulation layer IIL3 may be an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyimide-based resin, or a perylene-based resin. The third sensing insulation layer IIL3 including the organic material may reduce or prevent moisture or the like from being introduced into the first conductive layer ICL1 and the second conductive layer ICL2 from the outside.

Figure 5:
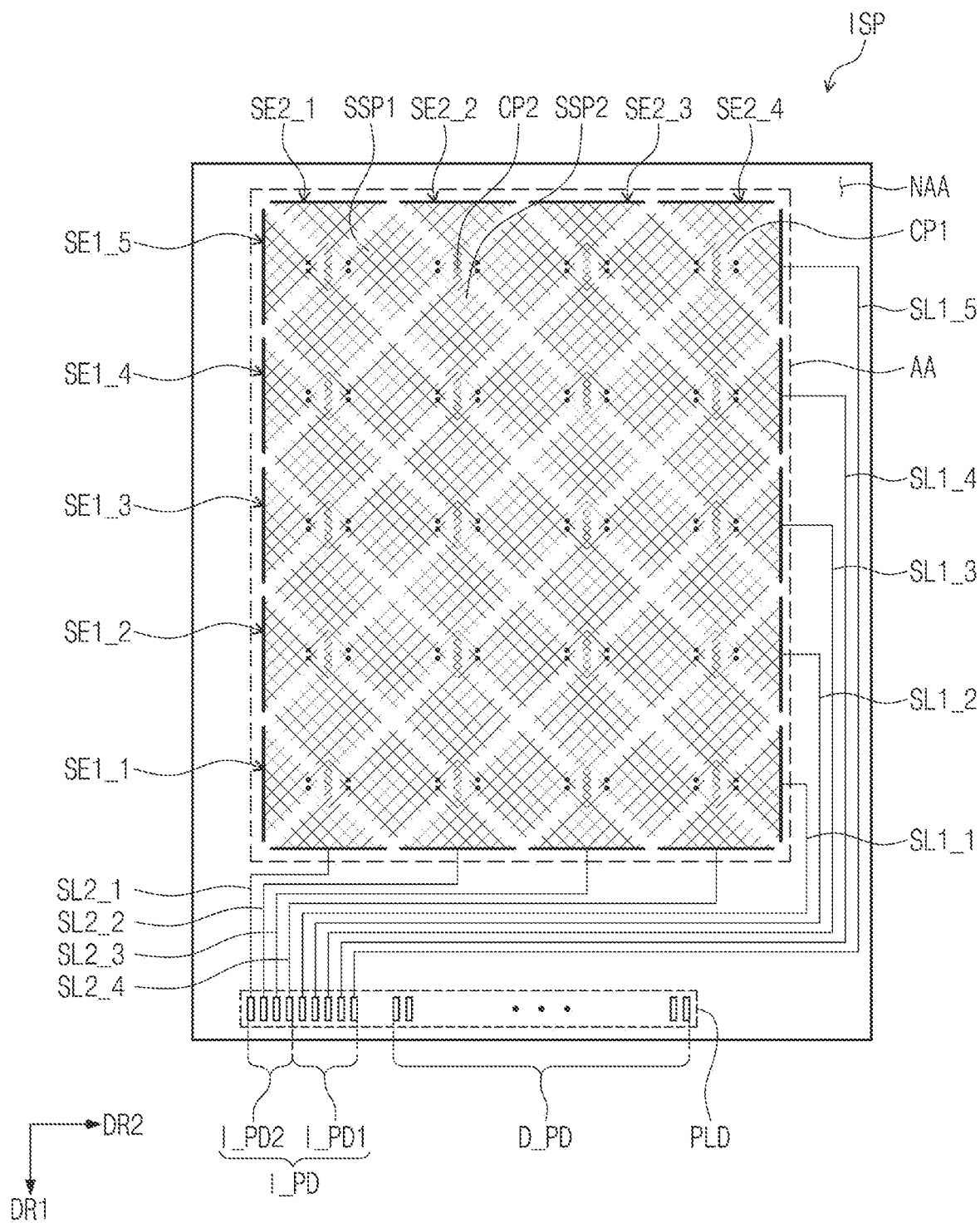
FIG. 5 is a plan view of the input sensing layer according to some embodiments of the present disclosure.

FIG. 5 is a plan view of the input sensing layer according to some embodiments of the present disclosure.

Referring to FIG. 5, the input sensing layer ISP according to some embodiments of the present disclosure includes an active area AA and a non-active area NAA adjacent to the active area AA. The plurality of sensing electrodes SE1_1 to SE1_5 and SE2_1 to SE2_4 may be located in the active area AA, and the plurality of signal lines SL1_1 to SL1_5 and SL2_1 to SL2_4 may be located in the non-active area NAA. As an example of some embodiments of the present disclosure, the sensing electrodes SE1_1 to SE1_5 and SE2_1 to SE2_4 include transmission electrodes SE1_1 to SE1_5 and reception electrodes SE2_1 to SE2_4.

The signal lines SL1_1 to SL1_5 and SL2_1 to SL2_4 may include transmission signal lines SL1_1 to SL1_5 connected to the transmission electrodes SE1_1 to SE1_5 and reception signal lines SL2_1 to SE2_4 connected to the reception electrodes SE2_1 to SE2_4.

The transmission electrodes SE1_1 to SE1_5 and the reception electrodes SE2_1 to SE2_4 cross each other. The transmission electrodes SE1_1 to SE1_5 are arranged in the first direction DR1, and each of the transmission electrodes SE1_1 to SE1_5 extends in the second direction DR2. The reception electrodes SE2_1 to SE2_4 are arranged in the second direction DR2, and each of the reception electrodes SE2_1 to SE2_4 extends in the first direction DR1.

The input sensing layer ISP may acquire coordinate information in a mutual capacitance mode. A capacitance is formed between the transmission electrodes SE1_1 to SE1_5 and the reception electrodes SE2_1 to SE2_4. The capacitance between the transmission electrodes SE1_1 to SE1_5 and the reception electrodes SE2_1 to SE2_4 may be changed by the first input TC1 (see FIG. 1) or the second input TC2 (see FIG. 1). Here, sensing sensitivity of the input sensing layer ISP may be determined according to a variation in capacitance. That is, as the variation in capacitance due to the first input TC1 or the second input TC2 increases, the sensing sensitivity of the input sensing layer ISP is improved.

However, the embodiments of the present disclosure are not limited thereto, and the input sensing layer ISP may acquire coordinate information in a self-capacitance mode. The transmission electrodes SE1_1 to SE1_5 and the reception electrodes SE2_1 to SE2_4 may be integrated into one sensing electrode to sense the first input TC1 or the second input TC2.

Each of the transmission electrodes SE1_1 to SE1_5 includes first sensor parts SSP1 and first connection parts CP1, which are located on the active area AA. Each of the reception electrodes SE2_1 to SE2_4 includes second sensor parts SSP2 and second connection parts CP2, which are located on the active area AA.

Each of two first sensor parts respectively located at both ends of one transmission electrode among the first sensor parts SSP1 may have a smaller size when compared to the other first sensor parts SSP1, and, for example, may have a size corresponding to about ½ of a size of the first sensor part located at a center. Each of two second sensor parts respectively located at both ends of the second electrode among the second sensor parts SSP2 may have a smaller size than the other second sensor parts SSP2, and, for example, may have a size corresponding to about ½ of a size of the second sensor part located at a center.

The transmission electrodes SE1_1 to SE1_5 and the reception electrodes SE2_1 to SE2_4 according to some embodiments are illustrated in FIG. 5, but their shapes are not limited thereto. In some embodiments of the present disclosure, each of the transmission electrodes SE1_1 to SE1_5 and the reception electrodes SE2_1 to SE2_4 may have a shape (e.g., a bar shape) in which there is no distinction between the sensor part and the connection part. Although the first sensor parts SSP1 and the second sensor parts SSP2, each of which has a diamond shape, are exemplarily illustrated, the embodiments of the present disclosure are not limited thereto. For example, the first sensor parts SSP1 and the second sensor parts SSP2 may have different polygonal shapes.

The first sensor parts SSP1 are arranged in the first direction DR1 within one transmission electrode, and the second sensor parts SSP2 are arranged in the second direction DR2 within one reception electrode. Each of the first connection parts CP1 connects the first sensor parts SSP1, which are adjacent to each other, and each of the second connection parts CP2 connects the second sensor parts SSP2, which are adjacent to each other.

Each of the transmission electrodes SE1_1 to SE1_5 and the reception electrodes SE2_1 to SE2_4 may have a mesh shape. Because each of the transmission electrodes SE1_1 to SE1_5 and the reception electrodes SE2_1 to SE2_4 has the mesh shape, a parasitic capacitance with the electrodes included in the display panel DP (see FIG. 2) may be reduced.

Each of the mesh-shaped transmission electrodes SE1_1 to SE1_5 and the mesh-shaped reception electrodes SE2_1 to SE2_4 may include silver, aluminum, copper, chromium, nickel, titanium, and the like, but is not limited thereto.

The transmission signal lines SL1_1 to SL1_5 and the reception signal lines SL2_1 to SL2_4 may be located on the inactive area NAA.

The input sensing layer ISP may include input pads I_PD that extend from ends of the transmission signal lines SL1_1 to SL1_5 and the reception signal lines SL2_1 to SL2_4 and are located on the inactive area NAA. The input pads I_PD may be electrically connected to the transmission signal lines SL1_1 to SL1_5 and the reception signal lines SL2_1 to SL2_4. As an example of some embodiments of the present disclosure, the input pads I_PD may include a transmission input pad I_PD1, to which the transmission signal lines SL1_1 to SL1_5 are electrically connected, and a reception input pad I_PD2, to which the reception signal lines SL2_1 to SL2_4 are electrically connected.

As an example of some embodiments of the present disclosure, the pad area PLD on which the input pads I_PD are located may be included in the non-active area NAA. The input pads I_PD may be provided by exposing some of the circuit elements located on the circuit element layer DP_CL (see FIG. 3) from the intermediate insulation layer included in the circuit element layer DP_CL.

The pad area PLD may further include pixel pads D_PD for connecting the flexible circuit film FCB (see FIG. 2) to the display panel DP (see FIG. 2).

Figure 6:
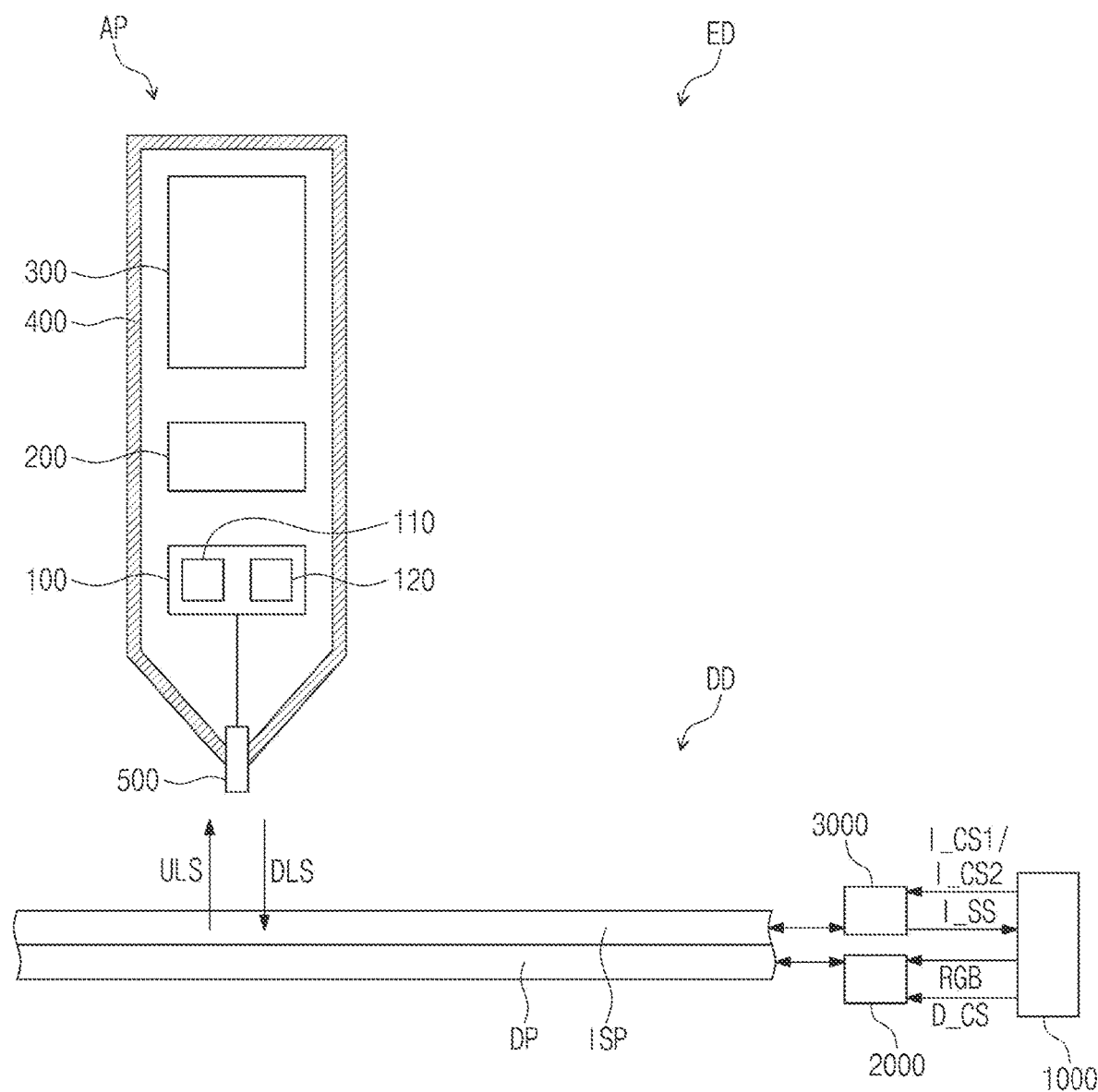
FIG. 6 is a schematic block diagram illustrating a display device and an input device according to some embodiments of the present disclosure.
Figure 7A:
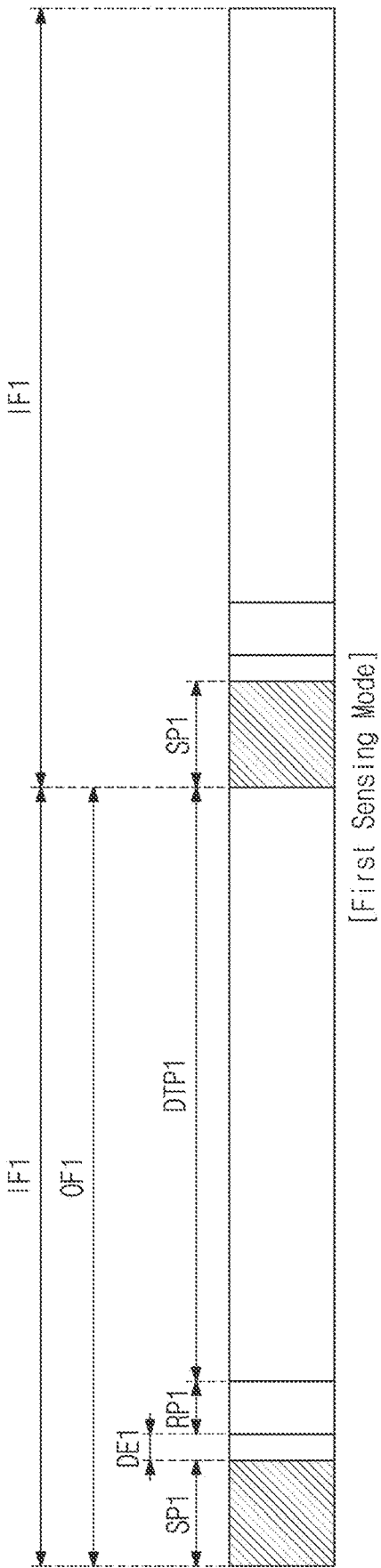
FIG. 7A is a conceptual view for explaining an operation in a first sensing mode according to some embodiments of the present disclosure.
Figure 7B:
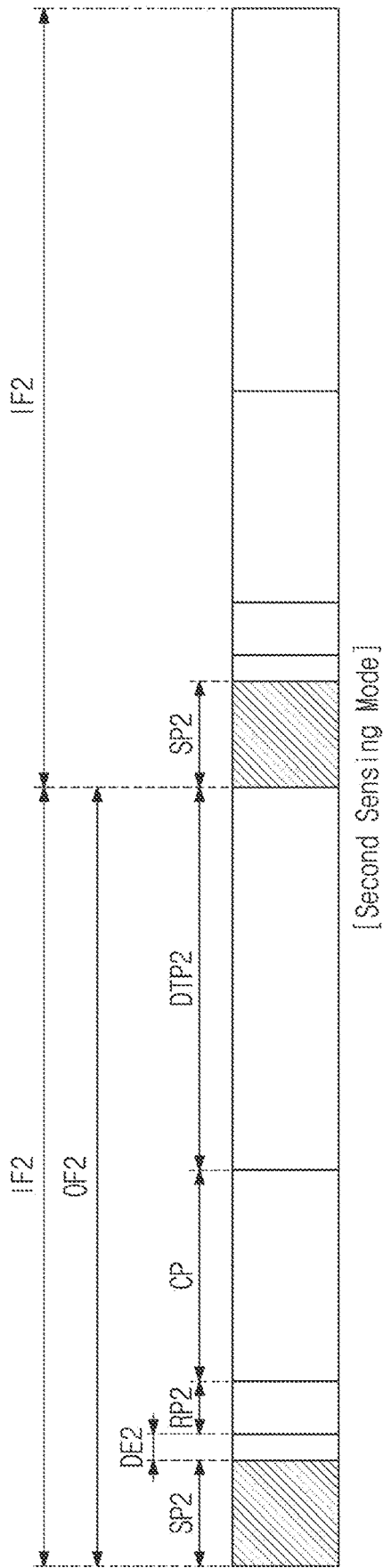
FIG. 7B is a conceptual view for explaining an operation in a second sensing mode according to some embodiments of the present disclosure.

FIG. 6 is a schematic block diagram illustrating the display device and the input device according to some embodiments of the present disclosure. FIG. 7A is a conceptual view for explaining an operation in a first sensing mode according to some embodiments of the present disclosure, and FIG. 7B is a conceptual view for explaining an operation in a second sensing mode according to some embodiments of the present disclosure.

Referring to FIG. 6, the display device DD may include a display panel DP, an input sensing layer ISP, a main controller 1000, a panel controller 2000, and a sensing controller 3000.

The input sensing layer ISP may be located on the display panel DP to sense an input applied from the outside. The input sensing layer ISP may sense the first input TC1 (see FIG. 1) by the user US (see FIG. 1) and/or the second input TC2 (see FIG. 1) by a first input device AP.

The main controller 1000 may control an overall operation of the electronic device ED. As an example of some embodiments of the present disclosure, the main controller 1000 may control operations of the panel controller 2000 and the sensing controller 3000.

The panel controller 2000 may receive image data RGB and a control signal D_CS from the main controller 1000. The control signal D_CS may include various signals. For example, the control signal D_CS may include a vertical synchronization signal, a horizontal synchronization signal, a main clock, and a data enable signal. The panel controller 2000 may generate a vertical initial signal and a horizontal initial signal for controlling timing at which a signal is applied to the display panel DP based on the control signal D_CS.

The sensing controller 3000 may control the input sensing layer ISP. The sensing controller 3000 may receive sensing control signals I_CS1 and I_CS2 from the main controller 1000. The sensing control signals I_CS1 and I_CS2 may include a first sensing control signal I_CS1 and a second sensing control signal I_CS2.

Each of the first and second sensing control signals I_CS1 and I_CS2 may include a mode determination signal and a clock signal, which determine a driving mode of the sensing controller 3000 in a first sensing mode of the input sensing layer ISP, which will be described later. A description of the first and second sensing control signals I_CS1 and I_CS2 will be described later with reference to description of FIGS. 8A and 8B.

The sensing controller 3000 may calculate coordinate information of the first input TC1 or the second input TC2 based on the signal received from the input sensing layer ISP, and may provide a coordinate signal I_SS having the coordinate information to the main controller 1000. The main controller 1000 executes an operation corresponding to a user input based on the coordinate signal I_SS. For example, the main controller 1000 may allow the panel controller 2000 to operate so that a new application image is displayed on the display panel DP based on the coordinate signal I_SS.

The input device AP may include a communication module 100, a pen controller 200, a power supply module 300, a housing 400, and a pen electrode 500. However, components constituting the first input device AP are not limited to the components listed above. For example, the first input device AP may further include an electrode switch for conversion to a signal transmission mode or a signal reception mode, a pressure sensor that senses a pressure, a memory that stores predetermined information, a rotation sensor that senses rotation, and the like.

The housing 400 may have a pen shape, and an accommodation space may be defined in the housing 400. The power supply module 300, the pen controller 200, the communication module 100, and the pen electrode 500 may be accommodated in an accommodation space defined inside the housing 400.

The power supply module 300 may supply power to the pen controller 200 and the communication module 100 inside the first input device AP. The power supply module 300 may include a battery or a high-capacity capacitor.

The pen controller 200 may control an operation of the first input device AP. The pen controller 200 may be an application-specific integrated circuit (ASIC). The pen controller 200 may be configured to operate according to a designed program.

The communication module 100 may include a transmission circuit 110 and a reception circuit 120. The reception circuit 120 may receive an uplink signal ULS provided from the input sensing layer ISP. The transmission circuit 110 may output a response signal in response to the uplink signal ULS and a downlink signal DLS to the input sensing layer ISP. The downlink signal DLS may include coordinate information of the second input TC2, intensity of the second input TC2, an inclination of the first input device AP, an amount of remaining power of the battery of the first input device AP, an operation state, and information such as an identification ID of the first input device AP. The transmission circuit 110 may receive a signal provided from the pen controller 200 to modulate the signal to a signal that is capable of being sensed by the input sensing layer ISP, and the reception circuit 120 may modulate the signal provided from the input sensing layer ISP to a signal that is capable of being processed by the pen controller 200.

The pen electrode 500 may be electrically connected to the communication module 100. A portion of the pen electrode 500 may protrude from the housing 400. Alternatively, the first input device AP may further include a cover housing that covers the pen electrode 500 exposed from the housing 400. Alternatively, the pen electrode 500 may be embedded in the housing 400. The pen electrode 500 may be a portion of the first input device AP, which is in direct contact with the input sensing layer ISP.

Referring to FIGS. 6 to 7B, the input sensing layer ISP may sense the first input TC1 or the second input TC2 in a unit of one sensing frame. When each of the operation frequencies OF1 and OF2 of the input sensing layer ISP are about 60 Hz, a time corresponding to one sensing frame may be about 16.67 ms. When the operation frequencies OF1 and OF2 of the input sensing layer ISP are about 120 Hz, a time corresponding to one sensing frame may be about 8.33 ms.

The input sensing layer ISP may operate in a first sensing mode, in which the first input TC1 is sensed, or in a second sensing mode, in which the second input TC2 is sensed, and may operate according to whether the first input device AP exists. For example, if the first input device AP is not recognized, the input sensing layer ISP may operate in the first sensing mode, and when the first input device AP is recognized, the input sensing layer ISP may operate in the second sensing mode. However, as an example of some embodiments of the present disclosure, the input sensing layer ISP may sense the second input TC2 as well as the first input TC1 in the second sensing mode.

Referring to FIGS. 6 and 7A, if the first input device AP is not recognized, the input sensing layer ISP may operate in the first sensing mode to sense the first input TC1. The operation frequency of the input sensing layer ISP in the first sensing mode may be referred to as a first operation frequency OF1. The sensing frame when the input sensing layer ISP operates in the first sensing mode may be referred to as a first sensing frame IF1. When the input sensing layer ISP operates in the first sensing mode, the first input TC1 may be sensed in at least one of the self-capacitance mode or the mutual capacitance mode.

The first sensing frame IF1 may include a first search period SP1 and a first sensing period DTP1. As an example of some embodiments of the present disclosure, the input sensing layer ISP may search for the first input device AP in the first search period SP1, and the first input TC1 may be sensed in at least one of the self-capacitance mode or the mutual capacitance mode in the first sensing period DTP1.

As an example of some embodiments of the present disclosure, in the first sensing frame IF1, the first sensing period DTP1 may follow the first search period SP1. Also, the first sensing period DTP1 may have a width that is greater than a width of the first search period SP1 (e.g., the first sensing period DTP1 may be temporally longer than the first search period SP1).

The sensing controller 3000 may transmit the uplink signal ULS to the input sensing layer ISP during the first search period SP1. The uplink signal ULS is a signal for searching for the first input device AP.

The first sensing frame IF1 may further include a first response period RP1, which is located between the first search period SP1 and the first sensing period DTP1 and in which a response signal transmitted by the first input device AP in response to the uplink signal ULS is received, or in which waiting occurs. As an example of some embodiments of the present disclosure, when the response signal is not received during the first response period RP1, the sensing controller 3000 may allow the input sensing layer ISP to operate in the first sensing mode.

As an example of some embodiments of the present disclosure, a first delay period DE1 may be located between the first search period SP1 and the first response period RP1. That is, the first response period RP1 may be temporally separated from the first search period SP1 by the first delay period DE1.

Referring to FIGS. 6 and 7B, when the first input device AP is recognized, the input sensing layer ISP may operate in the second sensing mode to sense the second input TC2. The operation frequency of the input sensing layer ISP in the second sensing mode may be referred to as a second operation frequency OF2. As an example of some embodiments of the present disclosure, the first operation frequency OF1 and the second operation frequency OF2 may be the same, but the present disclosure is not limited thereto. The sensing frame when the input sensing layer ISP operates in the second sensing mode may be referred to as a second sensing frame IF2. The second sensing frame IF2 may include a second search period SP2, a communication period CP, and a second sensing period DTP2.

The sensing controller 3000 may transmit the uplink signal ULS to the input sensing layer ISP during the second search period SP2, and the first input device AP may receive the uplink signal ULS through the input sensing layer ISP.

The sensing controller 3000 may receive the downlink signal DLS from the first input device AP through the input sensing layer ISP during the communication period CP. The sensing controller 3000 may sense the second input TC2 input by the first input device AP based on the downlink signal DLS.

The second sensing period DTP2 is defined as a period for which the sensing controller 3000 does not sense the second input TC2 through the input sensing layer ISP. However, as an example of some embodiments of the present disclosure, the sensing controller 3000 may sense the first input TC1 through the input sensing layer ISP during the second sensing period DTP2. The sensing controller 3000 may sense the first input TC1 during the second sensing period DTP2 in at least one of the self-capacitance mode or the mutual capacitance mode. When sensing the first input TC1 during the second sensing period DTP2, the sensing controller 3000 may sense the first input TC1 and the second input TC2 in the second sensing mode.

The second sensing frame IF2 may further include a second response period RP2, which is located between the second search period SP2 and the communication period CP, and in which a response signal from the first input device AP is received. As an example of some embodiments of the present disclosure, when the response signal is received during the second response period RP2, the sensing controller 3000 may allow the input sensing layer ISP to operate in the second sensing mode.

As an example of some embodiments of the present disclosure, a second delay period DE2 may be located between the second search period SP2 and the second response period RP2. That is, the second response period RP2 may be separated from the second search period SP2 by the second delay period DE2 in time.

Figure 8A:
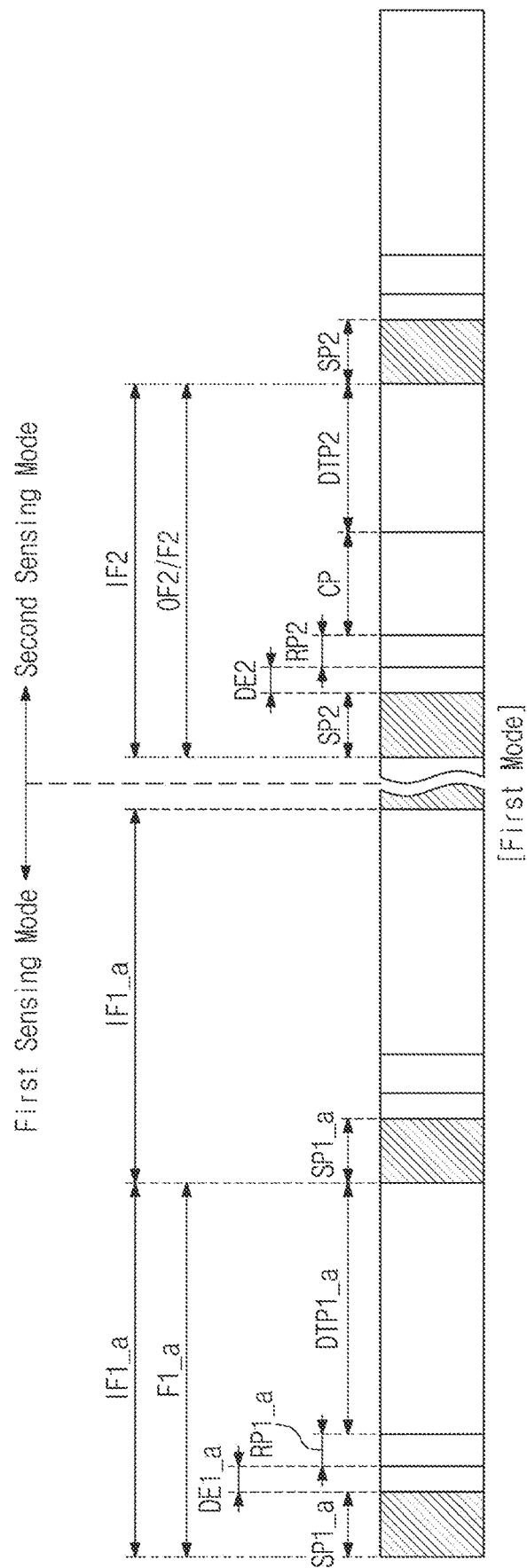
FIG. 8A is a conceptual view for explaining an operation in a first mode according to some embodiments of the present disclosure.
Figure 8B:
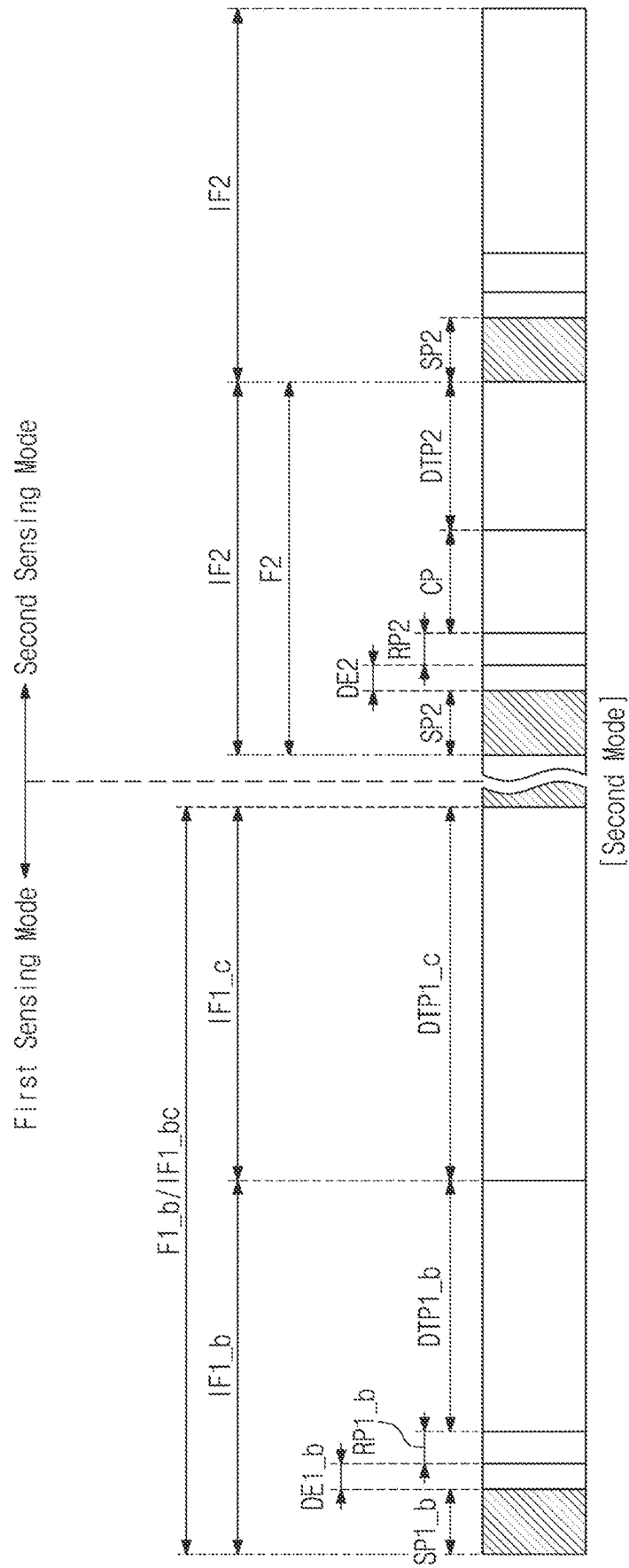
FIG. 8B is a conceptual view for explaining an operation in a second mode according to some embodiments of the present disclosure.

FIG. 8A is a conceptual view for explaining an operation in a first mode according to some embodiments of the present disclosure. FIG. 8B is a conceptual view for explaining an operation in a second mode according to some embodiments of the present disclosure. Hereinafter, descriptions of the same configuration as those described in FIGS. 7A and 7B will be omitted.

Referring to FIGS. 1, 6, 8A, and 8B, the sensing controller 3000 may operate in a first mode or a second mode in the first sensing mode.

As an example of some embodiments of the present disclosure, whether the sensing controller 3000 operates in the first mode or the second mode may be determined according to an application executed in the electronic device ED.

According to some embodiments of the present disclosure, a transmission frequency of the uplink signal ULS, which searches for the first input device AP, may vary according to a frequency of use of the first input device AP of the application executed in the electronic device ED.

For example, the main controller 1000 transmits the first sensing control signal I_CS1 to the sensing controller 3000 when a first application is executed in the electronic device ED. As an example of some embodiments of the present disclosure, the first application may be an application having a high frequency of performing a corresponding operation through the second input TC2 provided by the first input device AP among applications executed in the electronic device ED. As an example of some embodiments of the present disclosure, the first application may be an application, which waits for the second input TC2 provided by the first input device AP such as a notepad, an internet browser, a photoshop, a drawing program, etc., and which performs a correspond operation when the second input TC2 is sensed. The first application may include an application such as a camera.

When the sensing controller 3000 receives the first sensing control signal I_CS1, the sensing controller 3000 may operate in the first mode, in which the uplink signal ULS is transmitted at a first frequency F1_*a* to the input sensing layer ISP based on the first sensing control signal I_CS1. Thus, the sensing controller 3000 may search for the first input device AP for a period corresponding to the first frequency F1_*a*.

When the second application is executed in the electronic device ED, the main controller 1000 transmits a second sensing control signal I_CS2 to the sensing controller 3000. As an example of the present disclosure, the second application may be an application having a low frequency of performing a correspond operation through the second input TC2 provided by the first input device AP such as a game or a video among applications executed in the electronic device ED. Thus, in the second mode, the sensing controller 3000 transmits the uplink signal ULS for searching for the first input device AP at a second frequency F1_*b* that is less than the first frequency F1_*a*. However, as an example of some embodiments of the present disclosure, even an application corresponding to a game may be included in the first application when it is determined that a frequency of use of the second input TC2 provided by the first input device AP is high. This may be accomplished by changing classification data of the first application and the second application, which are preset in the electronic device ED.

When the sensing controller 3000 receives the second sensing control signal I_CS1, the sensing controller 3000 may operate in the second mode, in which the uplink signal ULS is transmitted at the second frequency F1_*b* to the input sensing layer ISP based on the second sensing control signal I_CS2. Thus, the sensing controller 3000 may search for the first input device AP for a period corresponding to the second frequency F1_*b*.

As an example of some embodiments of the present disclosure, in the first mode, the sensing controller 3000 may transmit the uplink signal ULS to the input sensing layer ISP at the first frequency F1_*a*.

When the input sensing layer ISP operates in the first mode, the first sensing frame may be referred to as a first mode sensing frame IF1_*a*.

The first mode sensing frame IF1_*a* may include a first mode search period SP1_*a* and a first mode sensing period DTP1_*a*. The input sensing layer ISP may search for the first input device AP in the first search period SP1, and may sense the first input TC1 in at least one of the self-capacitance mode or the mutual capacitance mode in the first sensing period DTP1. In the first mode, the first mode search period SP1_*a* is generated at a first frequency F1_*a*.

The first mode sensing frame IF1_*a* may further include a first mode delay period DE1_*a* and a first mode response period RP1_*a*.

As an example of some embodiments of the present disclosure, in the second mode, the sensing controller 3000 may transmit the uplink signal ULS to the input sensing layer ISP at the second frequency F1_*b*.

When the input sensing layer ISP operates in the second mode, the first sensing frame may be referred to as a second mode sensing frame IF1_*bc*.

The second mode sensing frame IF1_*bc* includes a first sub sensing frame IF1_*b* and a second sub sensing frame IF1_*c*.

The first sub sensing frame IF1_*b* may include a second mode search period SP1_*b* and a first sub sensing period DTP1_*b*. The first sub sensing frame IF1_*b* may further include a second mode delay period DE1_*b* and a second mode response period RP1_*b*.

The second sub sensing frame IF1_*c* may include a second sub sensing period DTP1_*c*. The second mode search period SP1_*b* may not be included in the second sub sensing frame IF1_*c*. Thus, in the second mode, the second mode search period SP1_*b* may be generated at a second frequency F1_*b* that is less than the first frequency F1_*a*.

The input sensing layer ISP may repeat the first sub sensing frame IF1_*b* including the second mode search period SP1_*b* and the second sub sensing frame IF1_*c*, which does not include the second mode search period SP1_*b*, to sense the first input TC1.

When the transmission frequency of the uplink signal ULS decreases to the second frequency F1_*b*, the second sub sensing period DTP1_*c* for sensing the first input TC1 may increase in width. For example, the second sub sensing period DTP1_*c* included in the second sub sensing frame IF1_*c*, which does not include the second mode search period SP1_*b*, may have a width greater than that of the first sub sensing period DTP1_*b* included in the first sub sensing frame IF1_*b* including the second mode search period SP1_*b*.

As an example of some embodiments of the present disclosure, the second sub sensing frame IF1_*c* may omit the second mode delay period DE1_*b* and the second mode response period RP1_*b*. The second sub sensing frame IF1_*c* may include only the second sub sensing period DTP1_*c*.

Thus, according to some embodiments of the present disclosure, in the first sensing mode until the first input device AP is recognized, the sensing controller 3000 may differently adjust the transmission frequency of the uplink signal ULS according to the application executed in the electronic device ED.

When the first application is being executed in the electronic device ED, the sensing controller 3000 may transmit the uplink signal ULS at the first frequency F1_*a* to quickly sense the first input device AP for providing the second input TC2.

When the second application is being executed in the electronic device ED, the sensing controller 3000 may transmit the uplink signal ULS at the second frequency F1_*b* to increase in width of the period for sensing the first input TC1.

When the sensing controller 3000 operates in the first mode, the first input TC1 is sensed in the first mode sensing period DTP1_*a* included in the first mode sensing frame IF1_*a*. When the sensing controller 3000 operates in the second mode, the first input TC1 may be sensed in the first sub sensing period DTP1_b included in the first sub sensing frame IF1_b and in the second sub sensing period DTP1_c included in the second sub sensing frame IF1_c. In this case, because the sum of the widths of the first and second sub sensing periods DTP1_b and DTP1_c is greater than the sum of the widths of the two first mode sensing periods DTP1_a, the first input TC1 of the input sensing layer ISP may be improved in sensing sensitivity.

Thus, the sensing controller 3000 in the first sensing mode may operate in the first mode or in the second mode according to the application executed in the electronic device ED to quickly sense the first input device AP, and may improve the sensing sensitivity of the first input TC1.

Referring to FIGS. 8A and 8B, when the sensing controller 3000 senses the first input device AP, the sensing controller 3000 operating in the first mode or the second mode operates in the second sensing mode. In the second sensing mode, the sensing controller 3000 may transmit the uplink signal ULS at the third frequency F2 to the input sensing layer ISP.

As an example of some embodiments of the present disclosure, the first frequency F1_a and the third frequency F2 may be the same.

Figure 9:
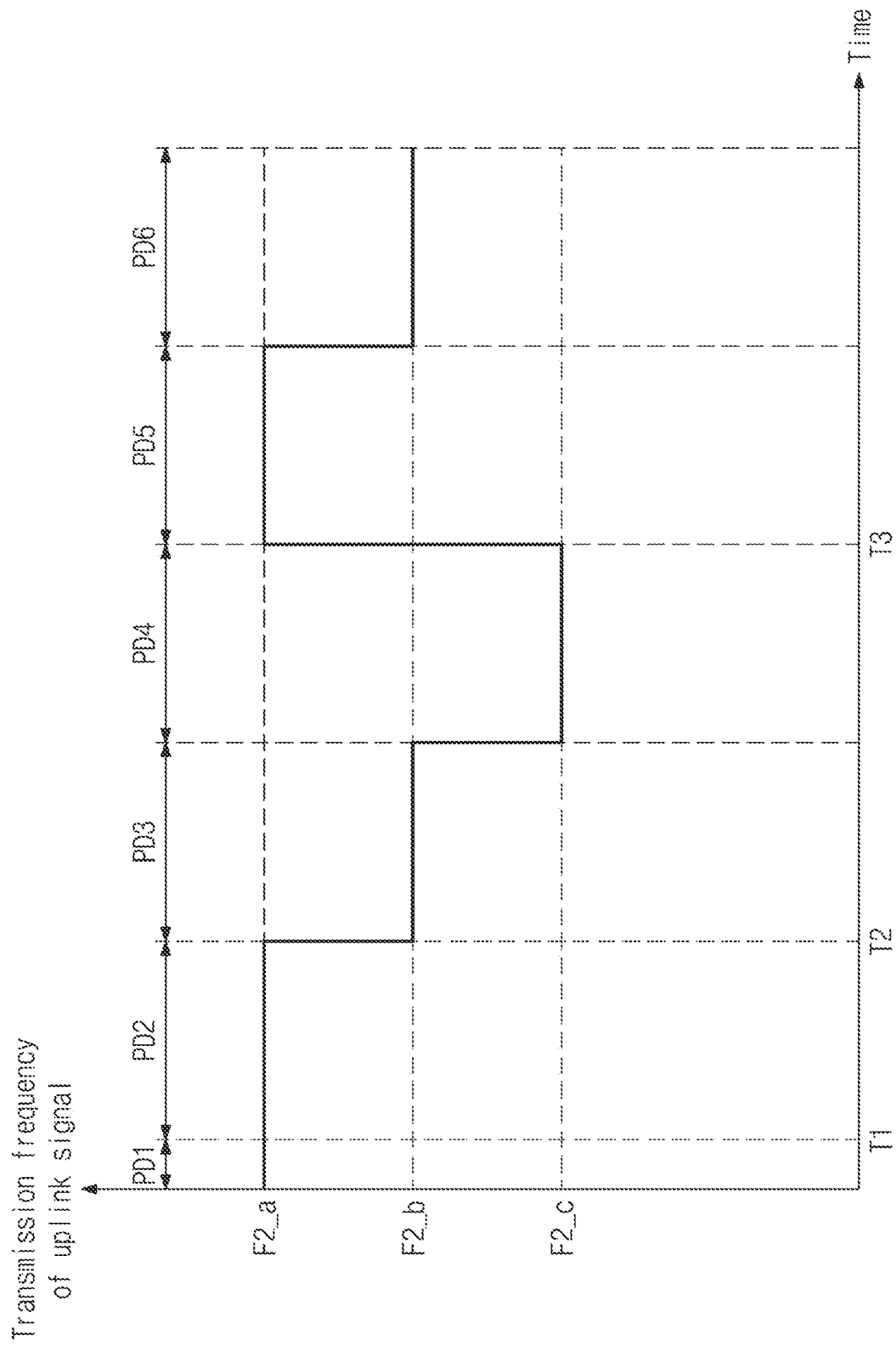
FIG. 9 is a graph for explaining a variation in frequency of an uplink signal depending on a time in a device sensing period according to some embodiments of the present disclosure.
Figure 10A:
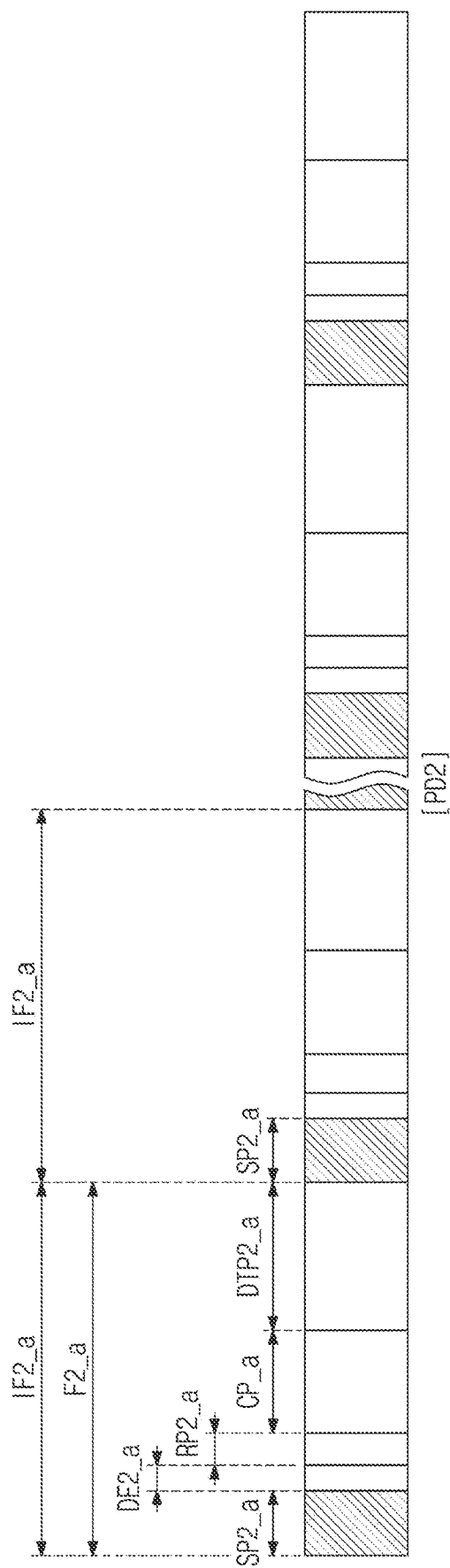
FIG. 10A is a conceptual view for explaining an operation in a first synchronization period included in the device sensing period of FIG. 9.
Figure 10B:
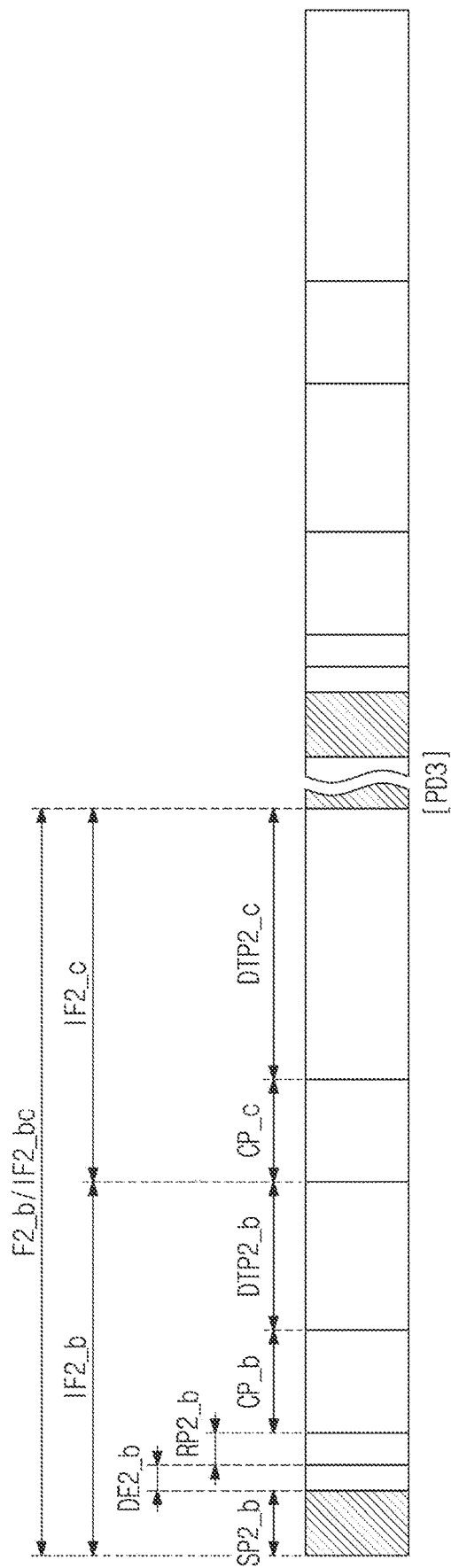
FIG. 10B is a conceptual view for explaining an operation in a first operation period included in the device sensing period of FIG. 9.
Figure 10C:
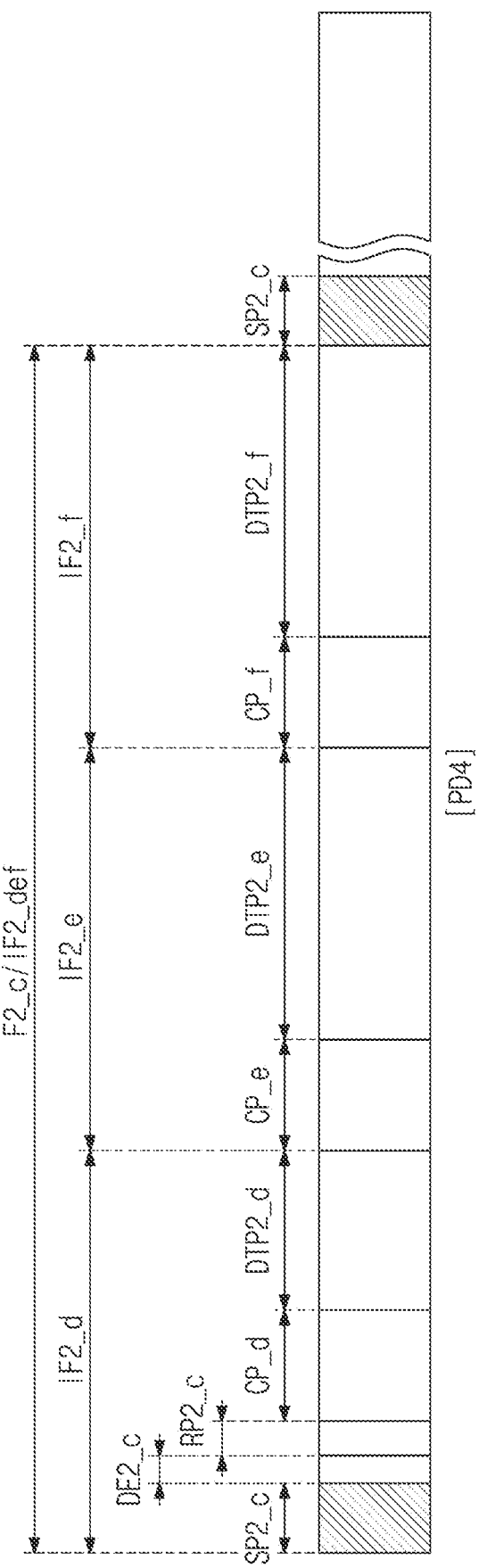
FIG. 10C is a conceptual view for explaining an operation in a second operation period included in the device sensing period of FIG. 9.

FIG. 9 is a graph for explaining a variation in frequency of the uplink signal depending on a time in the device sensing period according to some embodiments of the present disclosure. FIG. 10A is a conceptual view for explaining an operation in a first synchronization period included in the device sensing period of FIG. 9. FIG. 10B is a conceptual diagram illustrating an operation in a first operation period included in the device sensing period shown in FIG. 9, and FIG. 10C is a diagram illustrating an operation in a second operation period included in the device sensing period shown in FIG. 9. It is a conceptual diagram for explanation. Hereinafter, a duplicated description of the same period as the period described in FIGS. 7A to 8B will be omitted.

Referring to FIGS. 6, 7B, and 9, the input sensing layer ISP may operate in the second sensing mode for sensing the second input TC2 provided by the first input device AP. The period for which the input sensing layer ISP operates in the second sensing mode may be referred to as a device sensing period.

Referring to FIG. 9, the device sensing period may include a first synchronization period PD2, a first operation period PD3, a second operation period PD4, a second synchronization period PD5, and a third operation period PD6.

A finger sensing period PD1 is a period for which the input sensing layer ISP is operating in the first sensing mode. While the input sensing layer ISP operates in the first sensing mode, the input sensing layer ISP may switch to operate in the second sensing mode at a timing T1 at which the first input device AP is sensed. As an example of some embodiments of the present disclosure, the timing T1 at which the first input device AP is sensed may be a timing at which the sensing controller 3000 receives the response signal transmitted from the first input device AP in the first response period RP1 (see FIG. 7A). As an example of some embodiments of the present disclosure, a transmission frequency of the uplink signal ULS in the finger sensing period PD1 is illustrated as a first sub frequency F2_a, but the uplink signal ULS may be transmitted at a frequency that is less than the first sub frequency F2_a.

In the first synchronization period PD2, the sensing controller 3000 may transmit the uplink signal ULS at the first sub frequency F2_a to the input sensing layer ISP. During the first synchronization period PD2, the sensing controller 3000 may recognize the first input device AP based on an identification ID of the first input device AP, which is included in the downlink signal DLS, an amount of remaining power of a battery, and a current operation mode.

To allow the sensing controller 3000 to sense the second input TC2 based on the downlink signal DLS, the sensing controller 3000 has to be in a state of recognizing the first input device AP. Until the sensing controller 3000 recognizes the first input device AP, the sensing controller 3000 may transmit the uplink signal ULS at the first sub frequency F2_a to the first input device AP through the sensing layer ISP.

Referring to FIG. 10A, when the input sensing layer ISP operates in the first synchronization period PD2, the second sensing frame of the input sensing layer ISP may be referred to as a first synchronization frame IF2_a.

The first synchronization frame IF2_a includes a synchronization search period SP2_a, a synchronization delay period DE2_a, a synchronization response period RP2_a, a synchronization communication period CP_a, and a synchronization sensing period DTP2_a.

The input sensing layer ISP may search for the first input device AP in the synchronization search period SP2_a, and may receive the downlink signal DLS from the first input device AP during the synchronization communication period CP_a. The input sensing layer ISP may sense the first input TC1 in at least one of the self-capacitance mode and the mutual capacitance mode in the synchronization sensing period DTP2_a.

In the first synchronization period PD2, the synchronization search period SP2_a is generated at the first sub frequency F2_a.

However, as an example of some embodiments of the present disclosure, even before the sensing controller 3000 completes the recognition of the first input device AP, the sensing controller 3000 may receive the downlink signal DLS through the input sensing layer ISP in the synchronization communication period CP_a.

In the first operation period PD3, the sensing controller 3000 may transmit the uplink signal ULS at a frequency that is lower than the first sub frequency F2_a to the input sensing layer ISP. In the first operation period PD3, the sensing controller 3000 may transmit the uplink signal ULS at the second sub frequency F2_b that is less than the first sub frequency F2_a to the input sensing layer ISP.

During the first operation period PD3, the sensing controller 3000 may sense the second input TC2 based on coordinate information of the second input TC2 included in the downlink signal DLS received from the recognized first input device AP, may sense intensity of the second input TC2, and may sense information, such as an inclination of the first input device AP.

Referring to FIG. 10B, when the input sensing layer ISP operates in the first operation period PD3, the second sensing frame of the input sensing layer ISP may be referred to as a first operation frame IF2_bc.

The first operation frame IF2_bc includes a first sub operation frame IF2_b and a second sub operation frame IF2_c.

The first sub action frame IF2_b includes a first operation search period SP2_b, a first operation delay period DE2_b, a first operation response period RP2_b, a first operation communication period CP_b, and a first operation sensing period DTP2_b. The input sensing layer ISP may search for the first input device AP in the first operation search period SP2_b, and may receive the downlink signal DLS from the first input device AP during the first operation communication period CP_b. The input sensing layer ISP may sense the first input TC1 in at least one of the self-capacitance mode or the mutual capacitance mode in the first operation sensing period DTP2_b.

The second sub operation frame IF2_c includes a second operation communication period CP_c and a second operation sensing period DTP2_c. The first operation search period SP2_b is not included in the second sub action frame IF2_c. Thus, in the first operation period PD3, the first operation search period SP2_b may be generated at a second sub frequency F2_b that is less than the first sub frequency F2_a. As an example of some embodiments of the present disclosure, the second sub operation frame IF2_c may not include the first operation delay period DE2_b and the first operation response period RP2_b.

When the transmission frequency of the uplink signal ULS decreases to the second sub frequency F2_b in the first operation period PD3, the second operation sensing period DTP2_c for sensing the first input TC1 may increase in width. For example, the second operation sensing period DTP2_c included in the second sub sensing frame IF2_c, which does not include the first operation search period SP2_b, may have a width that is greater than that of the first operation sensing period DTP2_b included in the first sub sensing frame IF2_b including the first operation search period SP2_b.

As an example of some embodiments of the present disclosure, because the sensing controller 3000 has already recognized the first input device AP in the first synchronization period PD2, the sensing controller 3000 may receive information on the second input TC2 without recognizing the first input device AP in the first operation period PD3. Thus, in the first operation period PD3, the uplink signal ULS may be transmitted at the second sub frequency F2_b, and the width of the second operation sensing period DTP2_c may increase to improve the sensing sensitivity of the first input TC1.

In the second operation period PD4, the sensing controller 3000 may transmit the uplink signal ULS at a third sub frequency F2_c that is less than the second sub frequency F2_b to the input sensing layer ISP.

Referring to FIG. 10C, when the input sensing layer ISP operates in the second operation period PD4, the second sensing frame of the input sensing layer ISP may be referred to as a second operation frame IF2_def.

The second operation frame IF2_def includes a third sub operation frame IF2_d, a fourth sub operation frame IF2_e, and a fifth sub operation frame IF2_f.

The third sub action frame IF2_d includes a second operation search period SP2_c, a second operation delay period DE2_c, a second operation response period RP2_c, a third operation communication period CP_d, and a third operation sensing period DTP2_d.

The fourth sub operation frame IF2_e includes a fourth operation communication period CP_e and a fourth operation sensing period DTP2_e. The fifth sub operation frame IF2_f includes a fifth operation communication period CP_f and a fifth operation sensing period DTP2_f.

The fourth and fifth sub operation frames IF2_e and IF2_f do not include the second operation search period SP2_c. Thus, in the second operation period PD4, the second operation search period SP2_c may be generated at a third sub frequency F2_c that is less than the first and second sub frequency F2_a and F2_b.

When the transmission frequency of the uplink signal ULS decreases to the third sub frequency F2_c in the second operation period PD4, each of the fourth and fifth operation sensing periods DTP2_e and DTP2_f for sensing the first input TC1 may increase in width. For example, each of the fourth operation sensing period DTP2_e included in the fourth sub operation frame IF2_e, which does not include the second operation search period SP2_c, and the fifth operation sensing period DTP2_f included in the fifth sub operation frame IF2_f, which does not include the second operation search period SP2_c, may have a width that is greater than that of the third operation sensing period DTP2_d included in the third sub operation frame IF2_d including the second operation search period SP2_c.

As an example of some embodiments of the present disclosure, in the second operation period PD4, the sensing controller 3000 may transmit the uplink signal ULS at the third sub frequency F2_c that is less than each of the first and second sub frequencies F2_a and F2_b to the input sensing layer ISP to improve the sensing sensitivity of the first input TC1 in the first operation period PD3.

In the second synchronization period PD5, the sensing controller 3000 may transmit the uplink signal ULS at the first sub frequency F2_a to the input sensing layer ISP. When the input sensing layer ISP further senses the third input provided by the second input device after the first synchronization period PD2, the sensing controller 3000 may transmit the uplink signal ULS at the first sub frequency F2_a to the input sensing layer ISP until the second input device is recognized. The second synchronization period PD5 may be a period in which the sensing controller 3000 recognizes the first input device AP and the second input device. In this case, the uplink signal ULS may be a signal for sensing the first input device AP and the second input device. In FIG. 9, the second synchronization period PD5 is located after the first operation period PD3 and the second operation period PD4, but the present disclosure is not limited thereto. As an example of some embodiments of the present disclosure, the second synchronization period PD5 may be located between the first operation period PD3 and the second operation period PD4 according to the timing at which the second input device is recognized.

In the third operation period PD6, the sensing controller 3000 may transmit the uplink signal ULS at the second sub frequency F2_b to the input sensing layer ISP. In the third operation period PD6, the input sensing layer ISP may be a period in which a signal including information on the second input TC2 is received from the first input device AP, and a signal including information on the third input is received from the second input device.

Figure 11A:
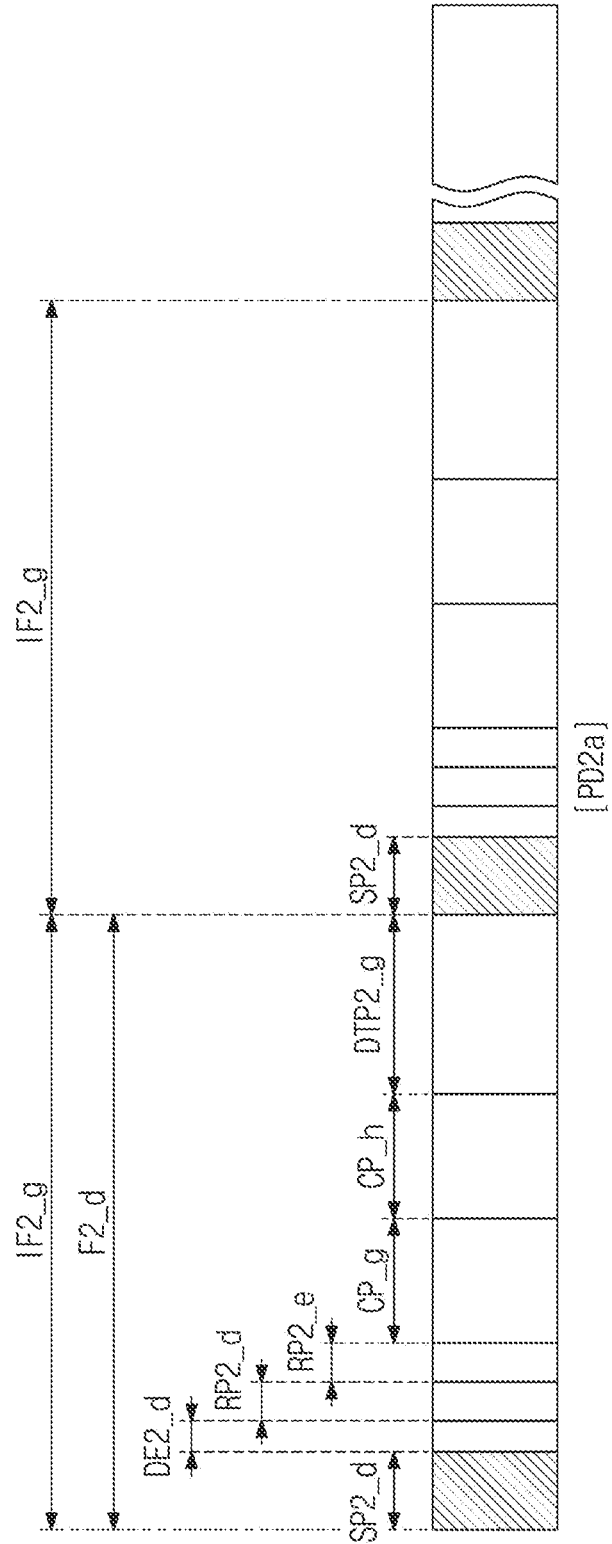
FIGS. 11A and 11B are conceptual views for explaining operations when the input sensing layer senses second and third inputs according to some embodiments of the present disclosure.
Figure 11B:
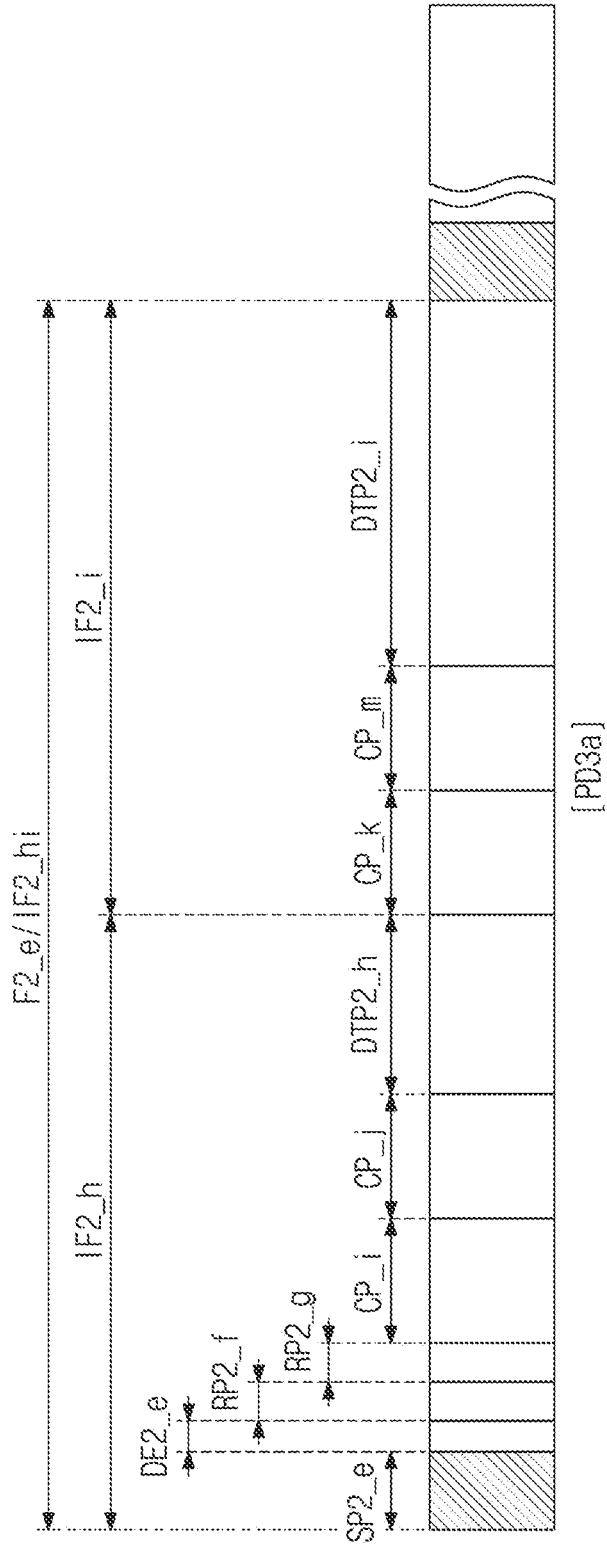

FIGS. 11A and 11B are conceptual views for explaining operations when the input sensing layer senses second and third inputs according to some embodiments of the present disclosure.

Referring to FIGS. 1, 6, 9, 11A, and 11B, as an example of some embodiments of the present disclosure, the input sensing layer ISP may sense the second input TC2 provided by the first input device AP and the third input provided by the second input device in the device sensing period.

FIG. 11A illustrates a first synchronization period PD2a in which the input sensing layer ISP recognizes the first input device AP and the second input device. When the input sensing layer ISP operates in the first synchronization period PD2a, the second sensing frame of the input sensing layer ISP may be referred to as a first synchronization frame IF2_g.

The first synchronization frame IF2_g includes a synchronization search period SP2_d, a synchronization delay period DE2_d, a first synchronization response period RP2_d, a second synchronization response period RP2_e, and a synchronization sensing period DTP2_g. The sensing controller 3000 receives a response signal from the first input device AP during the first synchronization response period RP2_d, and receives a response signal from the second input device during the second synchronization response period RP2_e. In the first synchronization frame IF2_g, the sensing controller 3000 includes a first synchronization communication period CP_g, in which the sensing controller 3000 receives the downlink signal DLS from the first input device AP, and a second synchronization communication period CP_h, in which the sensing controller 3000 receives the downlink signal from the second input device.

In the first synchronization period PD2a, the sensing controller 3000 may transmit the uplink signal ULS at the first sub frequency F2_d to the input sensing layer ISP.

FIG. 11B illustrates a first operation period PD3a in which the input sensing layer ISP receives signals including information on the second input TC2 and the third input. When the input sensing layer ISP operates in the first operation period PD3a, the second sensing frame of the input sensing layer ISP may be referred to as a first operation frame IF2_hi.

The first operation frame IF2_hi includes a first sub operation frame IF2_h and a second sub operation frame IF2_i.

The first sub action frame IF2_h includes a first operation search period SP2_e, a first operation delay period DE2_e, a first operation response period RP2_f, a second operation response period RP2_g, and a first operation sensing period DTP2_h. The first sub operation frame IF2_h may further include a first operation communication period CP_i and a second operation communication period CP_j.

The second sub action frame IF2_i includes a third operation communication period CP_k, a fourth operation communication period CP_m, and a second operation sensing period DTP2_i. The first operation search period SP2_e is not included in the second sub action frame IF2_i. Thus, in the first operation period PD3a, the first operation search period SP2_e may be generated at a second sub frequency F2_e that is less than the first sub frequency F2_d. As an example of some embodiments of the present disclosure, the second sub operation frame IF2_i may not include the first operation delay period DE2_e, the first operation response period RP2_f, and the second operation response period RP2_g.

When the transmission frequency of the uplink signal ULS decreases to the second sub frequency F2_e in the first operation period PD3a, the second operation sensing period DTP2_i for sensing the first input TC1 may increase in width. For example, the second operation sensing period DTP2_i included in the second sub operation frame IF2_i, which does not include the first operation search period SP2_e, may have a width greater than that of the first operation sensing period DTP2_h included in the first sub operation frame IF2_h including the first operation search period SP2_e.

Figure 12:
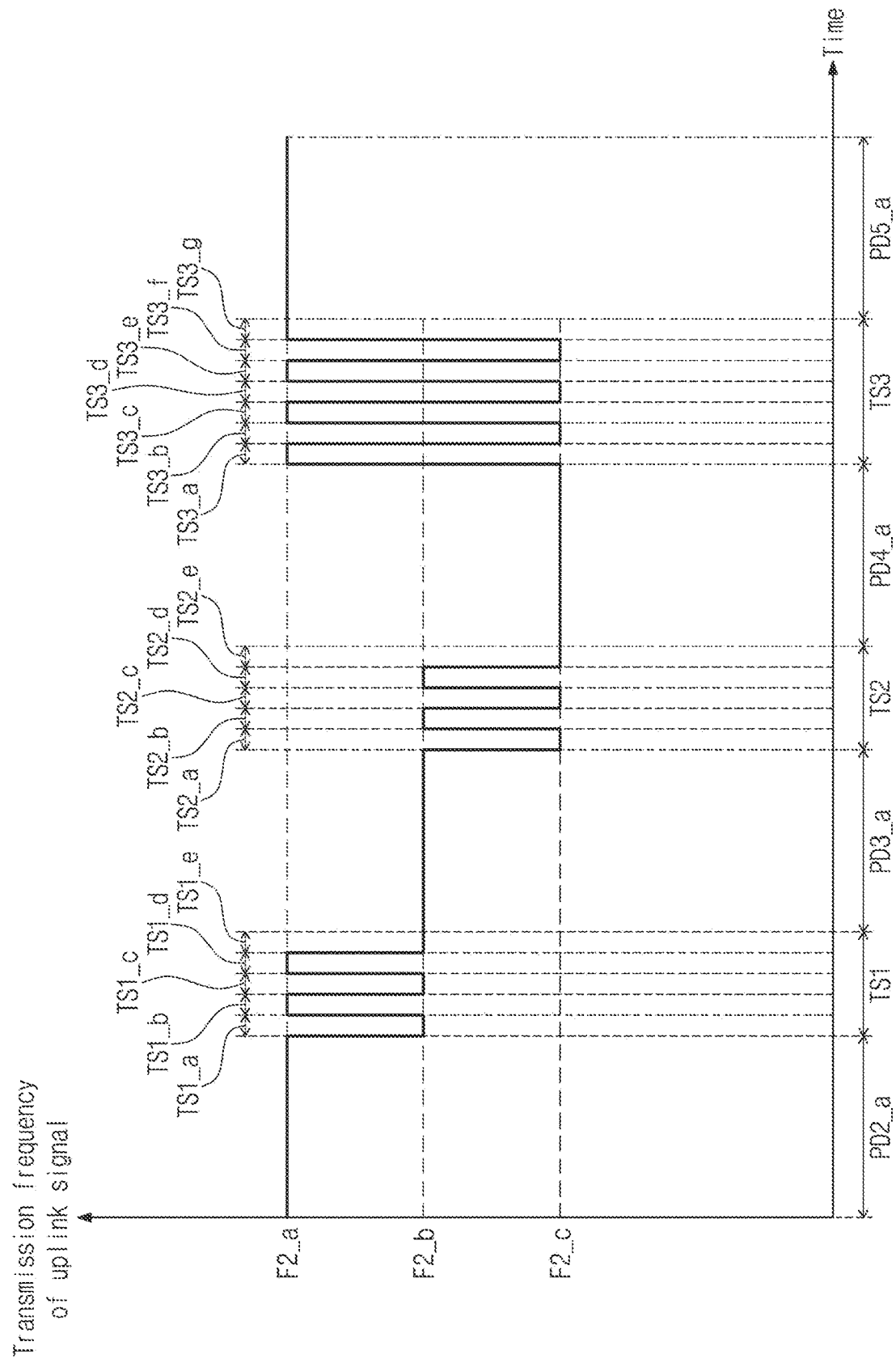
FIG. 12 is a conceptual view for explaining an operation in a transition period according to some embodiments of the present disclosure.

FIG. 12 is a conceptual view for explaining an operation in a transition period according to some embodiments of the present disclosure. Hereinafter, duplicated description of the same period as the period described in FIG. 9 will be omitted.

Referring to FIGS. 9 and 12, the device sensing period may include a first transition period TS1 located between a second period PD2_a and a third period PD3_a, a second transition period TS2 located between the third period PD3_a and a fourth period PD4_a, and a third transition period TS3 located between the fourth period PD4_a and a fifth period PD5_a.

As an example of some embodiments of the present disclosure, the first transition period TS1 may be a period in which the sensing controller 3000 converts the frequency of the uplink signal ULS transmitted to the input sensing layer ISP from the first sub frequency F2_a into the second sub frequency F2_b. The second transition period TS2 may be a period in which the sensing controller 3000 converts the frequency of the uplink signal ULS transmitted to the input sensing layer from the second sub frequency F2_b into the third sub frequency F2_c. The third transition period TS3 may be a period in which the sensing controller 3000 converts the frequency of the uplink signal ULS transmitted to the input sensing layer ISP from the first sub frequency F2_a into the second sub frequency F2_c.

As an example of some embodiments of the present disclosure, the first transition period TS1 may include first through fifth sub transition periods TS1_a to TS1_e. The second transition period TS2 may include sixth to tenth sub transition periods TS2_a to TS2_e. The third transition period TS3 may include eleventh to seventeenth sub transition periods TS3_a to TS3_g.

The sensing controller 3000 transmits the uplink signal ULS at the second sub frequency F2_b to the input sensing layer ISP in the first sub transition period TS1_a. The sensing controller 3000 transmits the uplink signal ULS at the first sub frequency F2_a to the input sensing layer ISP in the second sub transition period TS1_b. The sensing controller 3000 transmits the uplink signal ULS at the second sub frequency F2_b to the input sensing layer ISP in the third sub transition period TS1_c. The sensing controller 3000 transmits the uplink signal ULS at the first sub frequency F2_a to the input sensing layer ISP in the fourth sub transition period TS1_d. The sensing controller 3000 transmits the uplink signal ULS at the second sub frequency F2_b to the input sensing layer ISP in the fifth sub transition period TS1_e.

The sensing controller 3000 may alternate the frequency to the first sub frequency F2_a or the second sub frequency F2_b in each of the first to fifth sub transition periods TS1_a to TS1_e included in the first transition period TS1 to transmit the uplink signal ULS to the input sensing layer ISP. The sensing controller 3000 may alternate the frequency to the second sub frequency F2_b or the third sub frequency F2_c in each of the sixth to tenth sub transition periods TS2_a to TS2_e included in the second transition period TS2 to transmit the uplink signal ULS to the input sensing layer ISP. The sensing controller 3000 may alternate the frequency to the third sub frequency F2_c or the first sub frequency F2_a in each of the eleventh to seventeenth sub transition periods TS3_a to TS3_g included in the third transition period TS3 to transmit the uplink signal ULS to the input sensing layer ISP.

When noise exists around the electronic device ED, communication between the sensing controller 3000 and the input device AP may be unstable when the sensing controller 3000 transmits the uplink signal ULS at a frequency below a suitable frequency. Thus, in the first to third transition periods TS1, TS2, TS3, the sensing controller 3000 alternately transmits the uplink signal ULS at a frequency to be converted and a frequency before the convert to the input sensing layer ISP. Thus, it can be checked whether the communication between the sensing controller 3000 and the input device AP becomes unstable when the uplink signal ULS is transmitted at the frequency to be converted. Therefore, according to some embodiments of the present disclosure, even if the noise exists around the electronic device ED, the transmission frequency of the uplink signal ULS may be converted into the frequency at which the communication between the sensing controller 3000 and the input device AP is stable.

Figure 13A:
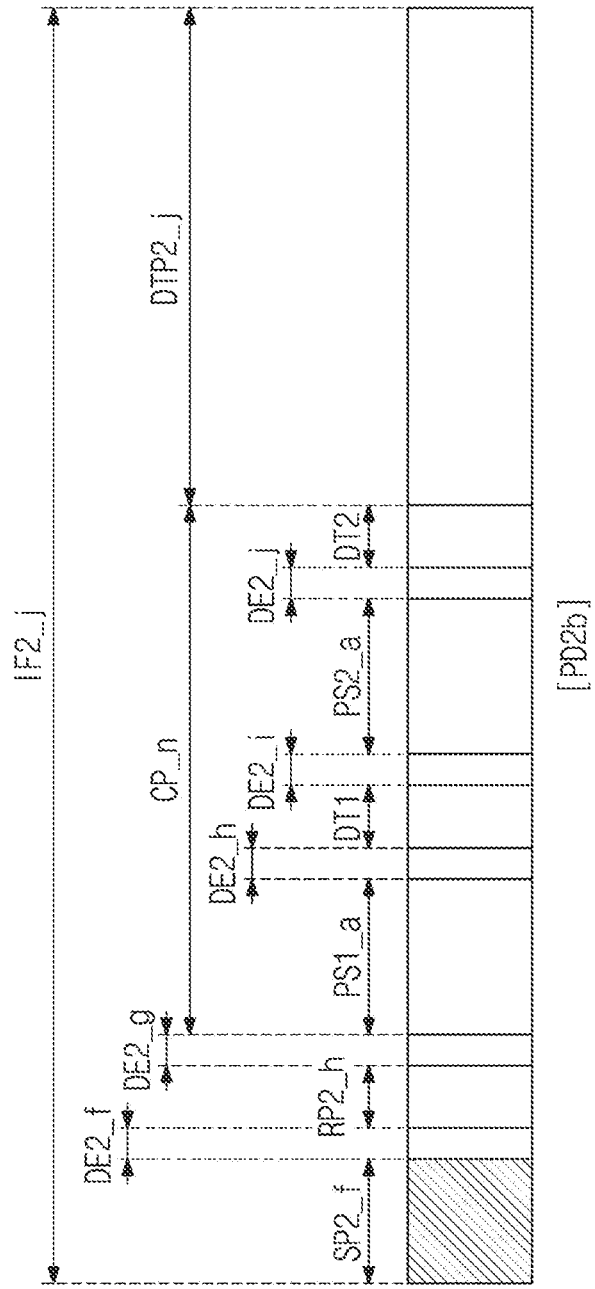
FIGS. 13A and 13B are conceptual views for explaining an operation of an input sensing layer in a downlink period according to some embodiments of the present disclosure.
Figure 13B:
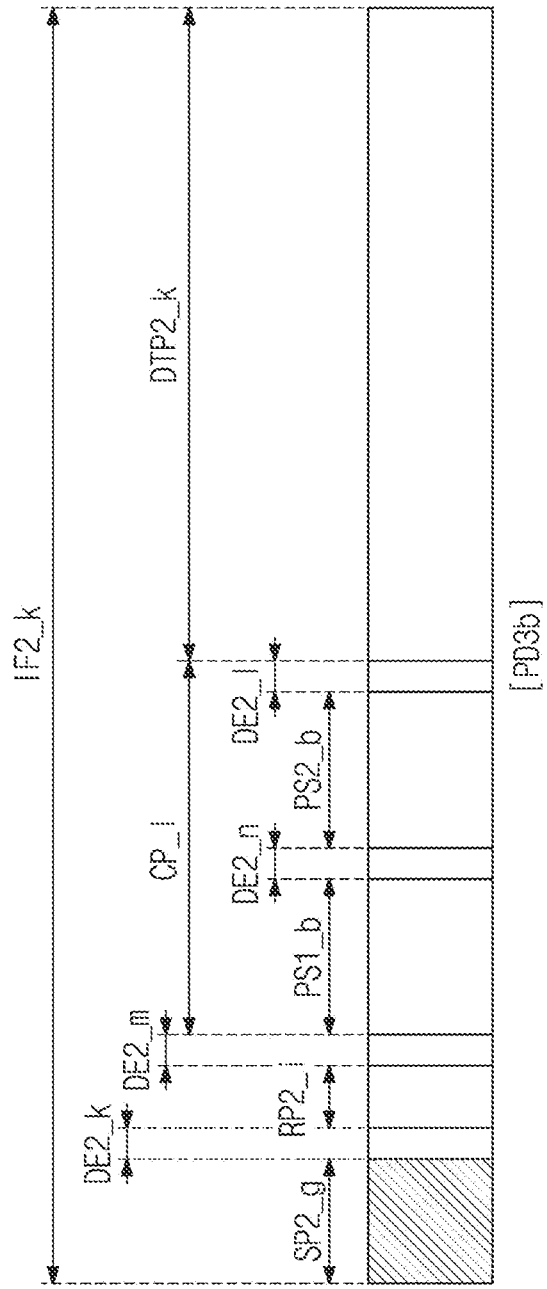

FIGS. 13A and 13B are conceptual views for explaining an operation of the input sensing layer in the downlink period according to some embodiments of the present disclosure. Hereinafter, duplicated description of the same period as the period described in FIG. 7B will be omitted.

Referring to FIGS. 13A and 13B, a first synchronization period PD2$b$ in which the input sensing layer ISP recognizes the first input device AP (see FIG. 1) is illustrated in FIG. 13A. When the input sensing layer ISP operates in the first synchronization period PD2$b$, the second sensing frame of the input sensing layer ISP may be referred to as a first synchronization frame IF2_$j$.

The first synchronization frame IF2_$j$ includes a synchronization search period SP2_$f$, a first synchronization delay period DE2_$f$, a synchronization response period RP2_$h$, a second synchronization delay period DE2_$g$, a synchronization communication period CP_n, and a synchronization sensing period DTP2_$j$. As an example of some embodiments of the present disclosure, the synchronization communication period CP_n includes a first data period DT1, a second data period DT2, a first position period PS1_$a$, and a second position period PS2_$a$. The input sensing layer ISP receives data signals including information on the first input device AP such as recognition ID of the first input device AP, an amount of remaining power of the battery, and the operation state of the first input device AP during the first and second data periods DT1 and DT2. The input sensing layer ISP receives a position signal including coordinate information of the second input TC2 and information on the second input TC2 such as an intensity of the second input TC2, an inclination of the first input device AP, which provides the second input TC2, and the like. As an example of some embodiments of the present disclosure, the synchronization communication interval CP_n may further include two or more data periods and may further include two or more position periods.

As an example of some embodiments of the present disclosure, the synchronization communication period CP_n may include communication delay periods DE2_$h$, DE2_$i$, and DE2_$j$ between the first and second data periods DT1 and DT2 and the first and second position periods PS1_$a$ and PS2_$a$.

FIG. 13B illustrates a first operation period PD3$b$ in which the input sensing layer ISP receives a signal including information on the second input TC2 (see FIG. 1). When the input sensing layer ISP operates in the first operation period PD3$b$, the second sensing frame of the input sensing layer ISP may be referred to as a first operation frame IF2_$k$. The first operation frame IF2_$k$ includes a first operation search period SP2_$g$, a first operation delay period DE2_$k$, a first operation response period RP2_$i$, a second operation delay period DE2_$m$, a first operation communication period CP_l, and a first operation sensing period DTP2_$k$. As an example of some embodiments of the present disclosure, the first operation communication period CP_l includes a third position period PS1_$b$ and a fourth position period PS2_$b$ for receiving a position signal including coordinate information of the second input TC2 and information on the second input TC2 such as an intensity of the second input TC2, an inclination of the first input device AP, which provides the second input TC2, and the like.

The first operation communication period CP_l does not include the first data period DT1 and the second data period DT2 for receiving a data signal including information on the first input device AP.

As an example of some embodiments of the present disclosure, when the first operation communication period CP_l does not include the first and second data periods DT1 and DT2, the first operation sensing period DTP2_$k$ for sensing the first input TC1 may increase in width.

For example, the first operation communication period CP_l included in the first operation frame IF2_$k$, in which the first and second data periods DT1 and DT2 are not included, may have a width that is less than that of the synchronization communication period CP_n included in the first synchronization frame IF2_$j$ including the first and second data periods DT1 and DT2. Thus, the first operation sensing period DTP2_$k$ included in the first operation frame IF2_$k$ may have a width that is greater than that of the synchronization sensing period DTP2_$j$ included in the first synchronization frame IF2_$j$.

In the first synchronization period PD2$b$, because the sensing controller 3000 has received the data signal including the information on the first input device AP, the sensing controller 3000 may receive the second input TC2 provided by the first input device AP even if the data signal including information on the first input device AP is not received in the first operation period PD3$b$. However, as an example of some embodiments of the present disclosure, the data period may also be included in the first operation period PD3$b$. In this case, the data period included in the first operation period PD3$b$ may have a cycle that is greater than that of each of the first and second data periods DT1 and DT2 included in the first synchronization period PD2$b$.

According to the embodiments of the present disclosure, in the electronic device that senses the first input provided by the user's body and the second input provided by the input device, the sensing sensitivity for the first input may be improved. For example, the electronic device may adjust the transmission period of the uplink signal for recognizing the external device to securing the long sensing period, thereby the sensing sensitivity of the first input.

It will be apparent to those skilled in the art that various modifications and deviations can be made in the present disclosure. Thus, it is intended that the present disclosure covers the modifications and deviations of this invention provided they come within the scope of the appended claims and their equivalents.

Accordingly, the technical scope of the present disclosure should not be limited to the contents described in the detailed description of the specification, but should be determined by the claims, with functional equivalents thereof to be include therein.

What is claimed is:

1. An electronic device comprising:
   a display panel configured to display an image;
   an input-sensing layer on the display panel, and configured to operate in a second sensing mode in which a second input provided by an input device is sensed, or in a first sensing mode in which a first input provided by an object other than the input device is sensed; and
   a sensing controller configured to transmit, to the input-sensing layer, an uplink signal for searching the input device,
   wherein, in the first sensing mode, the sensing controller transmits the uplink signal at a first frequency to the input-sensing layer when a first application is executed in the electronic device, wherein, in the first sensing mode, the sensing controller transmits the uplink signal at a second frequency that is less than the first frequency to the input-sensing layer when a second application that is different from the first application is executed in the electronic device such that a width of a period for sensing the first input increases, and wherein, in the second sensing mode, the sensing controller transmits the uplink signal at the first frequency to the input sensing input-sensing layer.

2. The electronic device of claim 1, further comprising a main controller configured to control an operation of the electronic device, and configured to transmit, to the sensing controller, a sensing control signal that controls an operation of the sensing controller.

3. The electronic device of claim 2, wherein the sensing control signal comprises a first sensing control signal and a second sensing control signal, and wherein the sensing controller operates in a first mode when the first sensing control signal is received, and operates in a second mode when the second sensing control signal is received.

4. The electronic device of claim 3, wherein the main controller is configured to transmit:
 the first sensing control signal to the sensing controller when the first application is executed in the electronic device, and
 the second sensing control signal to the sensing controller when the second application is executed in the electronic device.

5. The electronic device of claim 4, wherein the first application comprises an application that receives the second input to operate, and
 wherein the second application comprises an application that receives the first input to operate.

6. The electronic device of claim 1, wherein a device-sensing period in which the input-sensing layer operates in the second sensing mode comprises a synchronization period and an operation period, and
 wherein the sensing controller is configured to transmit:
  the uplink signal at the first frequency to the input-sensing layer during the synchronization period for recognizing the input device, and
  the uplink signal at a frequency that is less than the first frequency to the input-sensing layer during the operation period in which the second input is received.

7. The electronic device of claim 6, wherein the operation period comprises:
 a first operation period; and
 a second operation period, and
 wherein the sensing controller is configured to transmit:
  the uplink signal at a third frequency that is less than the first frequency to the input-sensing layer during the first operation period; and
  the uplink signal at a fourth frequency that is less than the third frequency to the input-sensing layer during the second operation period.

8. An electronic device comprising:
 a display panel configured to display an image;
 an input-sensing layer on the display panel, and configured to operate in a first sensing mode in which a first input is sensed, or a second sensing mode in which a second input provided by an input device is sensed; and
 a sensing controller configured to control an operation of the input-sensing layer, wherein, in the first sensing mode, the sensing controller operates in a first mode in which an uplink signal for searching the input device is transmitted at a first frequency to the input-sensing layer, or a second mode in which the uplink signal is transmitted at a second frequency, which is less than the first frequency, to the input-sensing layer, wherein, in the second sensing mode, the sensing controller transmits the uplink signal at the first frequency to the input-sensing layer, wherein a device-sensing period in which the input-sensing layer operates in the second sensing mode comprises a synchronization period and an operation period, and wherein the sensing controller is configured to transmit:
 the uplink signal at the first frequency to the input-sensing layer during the synchronization period for recognizing the input device, and
 the uplink signal at a frequency that is less than the first frequency to the input-sensing layer during the operation period in which the second input is received, and wherein the device-sensing period further comprises a transition period for converting the frequency of the uplink signal, which is transmitted from the sensing controller to the input-sensing layer, from the first frequency to a third frequency that is less than the first frequency.

9. The electronic device of claim 8, wherein the transition period comprises a first sub transition period and a second sub transition period,
 wherein the sensing controller is configured to transmit:
  the uplink signal at the first frequency to the input-sensing layer during the first sub transition period; and
  the uplink signal at the third frequency to the input-sensing layer during the second sub transition period, and
 wherein the first and second sub transition periods are alternately repeated within the transition period.

10. The electronic device of claim 1, wherein the input-sensing layer is configured to sense the first input in the second sensing mode.

11. An electronic device comprising:
 a display panel configured to display an image;
 an input-sensing layer on the display panel, and configured to operate in a first sensing mode in which a first input is sensed, or in a second sensing mode in which a second input provided by an input device is sensed; and
 a sensing controller configured to control an operation of the input-sensing layer,
 wherein a device-sensing period in which the input-sensing layer operates in the second sensing mode comprises a first synchronization period and a first operation period, and
 wherein the sensing controller is configured to transmit a first uplink signal for searching for a first input device at a first frequency to the input-sensing layer during the first synchronization period for recognizing the first input device, and to transmit the first uplink signal at a frequency that is less than the first frequency to the input-sensing layer during the first operation period in which the second input is received.

12. The electronic device of claim 11, wherein the device-sensing period further comprises a second operation period, wherein the sensing controller is configured to transmit:

the first uplink signal at a second frequency that is less than the first frequency to the input-sensing layer during the first operation period; and the first uplink signal at a third frequency that is less than the second frequency to the input-sensing layer during the second operation period.

13. The electronic device of claim 11, wherein the device-sensing period further comprises a transition period for converting the frequency of the first uplink signal, which is transmitted from the sensing controller to the input-sensing layer, from the first frequency to a second frequency that is less than the first frequency.

14. The electronic device of claim 13, wherein the transition period comprises a first sub transition period and a second sub transition period, wherein the sensing controller is configured to transmit:
the first uplink signal at the first frequency to the input-sensing layer during the first sub transition period; and
the first uplink signal at the second frequency to the input-sensing layer during the second sub transition period, and wherein the first and second sub transition periods are alternately repeated within the transition period.

15. The electronic device of claim 11, wherein the input-sensing layer is configured to sense a third input provided by a second input device in the second sensing mode, and wherein the sensing controller is configured to:
transmit, to the input-sensing layer, a second uplink signal at the first frequency for searching the first and second input devices during the first synchronization period to recognize the first and second input devices;
receive the second and third inputs; and
transmit the second uplink signal at a frequency that is less than the first frequency to the input-sensing layer during the first operation period.

16. The electronic device of claim 11, wherein the input-sensing layer is configured to sense a third input provided by a second input device after the first synchronization period, wherein the device-sensing period further comprises a second synchronization period and a second operation period, and wherein the sensing controller is configured to transmit:
a second uplink signal to the input-sensing layer at the first frequency for searching the first and second input devices during the second synchronization period for recognizing the first and second input devices; and
the second uplink signal to the input-sensing layer at a second frequency that is less than the first frequency during the second operation period in which the first and second inputs are received.

17. The electronic device of claim 11, wherein the sensing controller is configured to sense the first input through the input-sensing layer during a first input sensing frame in the first sensing mode, and to sense the second input through the input-sensing layer during a second input sensing frame in the second sensing mode, wherein the second input sensing frame comprises:
a first period in which the sensing controller transmits the first uplink signal to the input-sensing layer;
a second period in which the sensing controller receives a downlink signal from the first input device through the input-sensing layer; and
a third period in which the sensing controller does not sense the second input through the input-sensing layer.

18. The electronic device of claim 17, wherein, in the first synchronization period, the second period comprises:
a data period in which a data signal comprising information on the first input device is received; and
a first position period in which a position signal comprising information on the second input is received, wherein, in the first operation period, the second period comprises a second position period in which the position signal comprising the information on the second input is received, and wherein the second period does not comprise a period in which the data signal comprising the information on the first input device is received.

19. The electronic device of claim 18, wherein the third period in the first operation period has a width that is greater than that of the third period in the first synchronization period.

20. The electronic device of claim 17, wherein the sensing controller is configured to sense the first input through the input-sensing layer in the third period.

* * * * *

UNITED STATES PATENT AND TRADEMARK OFFICE
CERTIFICATE OF CORRECTION

| | | |
|---|---|---|
| PATENT NO. | : 12,045,422 B2 | Page 1 of 1 |
| APPLICATION NO. | : 17/581377 | |
| DATED | : July 23, 2024 | |
| INVENTOR(S) | : Soongyu Lee et al. | |

It is certified that error appears in the above-identified patent and that said Letters Patent is hereby corrected as shown below:

In the Claims

In Column 29, Line 10, in Claim 1, delete "input sensing input-sensing" and insert -- input-sensing --.

Signed and Sealed this
Tenth Day of June, 2025

Coke Morgan Stewart
*Acting Director of the United States Patent and Trademark Office*